US012747317B2

(12) United States Patent
Weinert

(10) Patent No.: US 12,747,317 B2
(45) Date of Patent: Sep. 29, 2026

(54) ELASTIC MATERIALS PREPARED FROM ENERGY-CURABLE LIQUID COMPOSITIONS

(71) Applicant: Arkema France, Colombes (FR)

(72) Inventor: Zackariah Weinert, King of Prussia, PA (US)

(73) Assignee: Arkema France, Puteaux (FR)

( * ) Notice: Subject to any disclaimer, the term of this patent is extended or adjusted under 35 U.S.C. 154(b) by 615 days.

(21) Appl. No.: 17/915,178

(22) PCT Filed: Apr. 1, 2021

(86) PCT No.: PCT/EP2021/058550
§ 371 (c)(1),
(2) Date: Sep. 28, 2022

(87) PCT Pub. No.: WO2021/198398
PCT Pub. Date: Oct. 7, 2021

(65) Prior Publication Data

US 2023/0124643 A1 Apr. 20, 2023

(30) Foreign Application Priority Data

Apr. 1, 2020 (FR) ...................................... 2003255

(51) Int. Cl.
*C08F 290/06* (2006.01)
*C08F 220/18* (2006.01)
*C08F 220/28* (2006.01)

(52) U.S. Cl.
CPC ........ *C08F 290/067* (2013.01); *C08F 220/18* (2013.01); *C08F 220/286* (2020.02)

(58) Field of Classification Search
CPC . C08F 290/067; C08F 220/18; C08F 220/286
See application file for complete search history.

(56) References Cited

U.S. PATENT DOCUMENTS 6,197,459 B1 3/2001 Leach
2008/0254288 A1* 10/2008 Yamaguchi .......... C09D 175/16 525/123
2009/0238984 A1 9/2009 Tomita et al.
2010/0160557 A1* 6/2010 Murofushi ......... C08G 18/3853 560/221
2014/0051797 A1* 2/2014 Kaneko ............. D06M 15/3564 524/544
2015/0368388 A1 12/2015 Kurata et al.
2016/0002497 A1 1/2016 Jeffries et al.
2018/0178503 A1* 6/2018 Shuey ...................... C08K 5/10
2021/0171760 A1 6/2021 Gupta et al.
2023/0118566 A1 4/2023 Amin et al.

FOREIGN PATENT DOCUMENTS

EP 982629 A1 * 3/2000 .............. B41M 1/04
JP S50133005 A1 10/1975
JP 2660549 B2 12/1989
JP 2003156837 A2 5/2003
JP 2007500633 A 1/2007
WO WO2007001937 A2 1/2007
WO WO2017208238 A1 12/2017
WO WO-2018184847 A1 * 10/2018 ............. B65D 33/18

OTHER PUBLICATIONS

Schneider, HA, "Polymer class specificity of the glass temperature", Polymer 46 (2005) 2230-2237. (Year: 2005).*
Aldrich, Thermal Transitions of Homopolymers, retrieved from https://www3.nd.edu/~hgao/thermal_transitions_of_homopolymers.pdf using the Internet Archive snapshot from May 20, 2016. (Year: 2016).*

* cited by examiner

*Primary Examiner* — Kregg T Brooks
*Assistant Examiner* — David R. Foss
(74) *Attorney, Agent, or Firm* — Christopher R. Lewis

(57) ABSTRACT

An elastic material is provided having an elongation greater than 150% as measured according to ASTM D638-02a, a resiliency greater than 12% as measured according to ASTM D2632-01 (reapproved 2008), and a Shore A hardness of at least 10 as measured by ASTM D2240-15e1. The elastic material is an energy-cured reaction product of a curable composition that is a liquid at 25° C. The curable composition includes at least a) relatively high molecular weight (meth)acrylate-functionalized oligomer having no more than two (meth)acrylate functional groups per molecule on average; b) at least one mono(meth)acrylate-functionalized monomer having a molecular weight of less than 500 Daltons and a single (meth)acrylate functional group per molecule and/or an ethylenically unsaturated nitrogen-containing monomer; and c) at least one multi(meth)acrylate-functionalized monomer having a molecular weight of less than 1000 Daltons and at least two (meth)acrylate functional groups per molecule.

21 Claims, No Drawings

ELASTIC MATERIALS PREPARED FROM ENERGY-CURABLE LIQUID COMPOSITIONS

CROSS-REFERENCE TO RELATED APPLICATIONS

This application is a U.S. national stage application under 35 U.S.C. § 371 of international application number PCT/EP2021/058550, filed Apr. 1, 2021, which claims priority to French patent application number FR2003255, filed Apr. 1, 2020.

FIELD OF THE INVENTION

The present invention relates to compositions that are liquid at room temperature and capable of being cured, in particular by energy curing, to provide elastic materials (elastomers).

BACKGROUND OF THE RELATED ART

Energy-curing (EC) refers to the conversion of a curable composition (which may also be referred to as a "resin") to a polymer using an energy source such as an electron beam (EB), a light source (for example a visible light source, a near-UV light source, an ultraviolet lamp (UV) a light-emitting diode (LED) or an infrared light source) and/or heat. A composition that is capable of being polymerized through exposure to such an energy source may be referred to as an energy-curable composition. A material that is prepared by polymerizing a curable composition with EB or a light source (for example visible, near-UV, UV LED or infrared) and/or heat can be regarded as an energy-cured material.

A wide range of material properties is potentially accessible with energy curing technology. This breadth is evident by the many applications that use energy-curable compositions: wood coatings, plastic coatings, glass coatings, metal coatings, finish films, mechanical performance coatings, durable hardcoats, inkjet inks, flexographic inks, screen inks, over-print varnishes, nail gel resins, dental materials, pressure-sensitive adhesives, laminating adhesives, electronic display components, photoresists, 3D-printing resins, and more. However, the industry is continually working to access new "material property space" that has previously been out of reach for energy-curable compositions and materials prepared therefrom. Property space refers to combinations of different material properties given certain constraints. For certain end uses, energy-cured materials having elastomeric properties would be of great interest. However, energy-curable compositions which are liquid at room temperature and yet capable of being energy-cured to yield elastic materials have to date not been widely explored or developed.

In order to achieve the resiliency desired in an elastomer, a material must 1) deform under stress and 2) quickly return to its original shape after the stress is removed. In a polymeric material, crosslinking between the polymer chains decreases its ability to deform. Thus, too much crosslinking will preclude any resiliency. On the other hand, crosslinking is required for the material to return to its original shape after the stress is removed. For a given composition, there is a crosslink density that provides optimal resiliency. A material's elongation is also highly dependent on the crosslink density; crosslinking decreases elongation. The crosslink density required for rebound is enough to severely limit the elongation. For this reason, the defining challenge in formulating an energy-curable composition that is capable of providing an elastic material once cured is simultaneously obtaining high elongation and high resiliency.

SUMMARY OF THE INVENTION

One aspect of the present invention is an elastic material having an elongation greater than 150% as measured according to ASTM D638-02a, a resiliency greater than 12% as measured according to ASTM D2632-01 (reapproved 2008), and a Shore A hardness of at least 10 as measured by ASTM D2240-15e1 (unless otherwise specified in the ASTM method, the foregoing properties are each measured at 25° C.). The elastic material is an energy-cured reaction product of a curable composition which is a liquid at 25° C. and which is comprised of, consists essentially of, or consists of components a), b) and c):

Component a): 43 to 89.9% by weight, based on the total weight of components a), b) and c), of (meth)acrylate-functionalized oligomer having no more than two (meth) acrylate functional groups per molecule on average, wherein the number average molecular weight of component a) as a whole as measured using gel permeation chromatography and polystyrene standards is at least 10,000 Daltons;

Component b): 10 to 55% by weight, based on the total weight of components a), b) and c), of at least one mono (meth)acrylate-functionalized monomer having a molecular weight of less than 500 Daltons and a single (meth)acrylate functional group per molecule and/or an ethylenically unsaturated nitrogen-containing monomer;

Component c): 0.1 to 10% by weight, based on the total weight of components a), b) and c), of at least one multi (meth)acrylate-functionalized monomer having a molecular weight of less than 1000 Daltons and at least two (meth) acrylate functional groups per molecule.

As will be explained in more detail subsequently, the curable composition may optionally contain one or more further components, in particular an initiator system such as one or more photoinitiators.

DETAILED DESCRIPTION OF EMBODIMENTS OF THE INVENTION

Definitions

In the present application, the term "comprise(s) a/an" means "comprise(s) one or more".

Unless mentioned otherwise, the % by weight in a compound or a composition are expressed based on the weight of the compound, respectively of the composition.

The term "X is substantially free of Y" means that X comprises less 10%, less than 5%, less than 2%, less than 1%, less than 0.5%, less than 0.1%, less than 0.01%, or even 0% by weight of Y.

The term "C$\alpha$-C$\beta$ group/linker" wherein $\alpha$ and $\beta$ are integers means a group/linker having a number of carbon atoms from $\alpha$ to $\beta$.

As used herein, the term "(meth)acrylate functional group" refers to either an acrylate functional group ($-O-C(=O)-CH=CH_2$) or a methacrylate functional group ($-O-C(=O)-C(CH_3)=CH_2$). When not followed by the phrase "functional group," the term "(meth)acrylate" refers to a chemical compound that contains at least one acrylate functional group per molecule or at least one methacrylate functional group per molecule. "(Meth)acrylate" can also refer to a chemical compound that has both at least one acrylate functional group and at least one methacrylate functional group. "Functionality" refers to the number of (meth)acrylate functional groups per molecule. It does not refer to any other functional groups besides (meth)acrylate functional groups unless explicitly stated. For example, a difunctional monomer is understood to mean a monomer with two (meth)acrylate functional groups per molecule. On the other hand, a trifunctional alcohol is understood to mean a compound with three hydroxyl groups per molecule with no (meth)acrylate groups.

The term "oligomer" is understood to refer to an organic substance that contains a plurality of repeating units (e.g., oxyalkylene repeating units) and a polydispersity (Mw/Mn) greater than 1. A monomer may or may not contain a plurality of repeating units, but is a discrete, single molecule. For example, 2(2-ethoxy ethoxy) ethyl acrylate contains two oxyethylene repeating units, but is considered a monomer rather than an oligomer since it is a compound having a defined structure rather than a mixture of structurally related compounds having a distribution of molecular weights (and thus a polydispersity >1).

As used herein, the term "elastic material" refers to a material having one or more elastomeric properties such as, qualitatively, high elongation, high resiliency, high toughness, high elasticity, and/or high elastic recovery. Quantitatively, these properties will vary depending on the specifics of the end use application for the elastic material. Elongation refers to the total deformation of a sample before breaking. High elongation might be >75, 150, 225 or 300% when tested according to ASTM D638-02a. Resiliency refers to the rebound height of an object that bounces off the surface of the material, expressed as a percent of the object's original height. High resiliency might be >10, 20, 30 or 40% when tested according to ASTM D2632-01 (reapproved 2008). Toughness refers to the integration of a tensile stress-strain curve and elasticity refers to the maximum deformation to which a material can be stretched and still return to its original shape. High elasticity might be 100, 200 or 300% when tested according to ASTM D638-02a. In addition, fast speed of recovery is also desired. These material properties are not unrelated. For example, all else being equal, higher elongation generally means higher toughness, while good elastic recovery is associated with good resiliency.

The term «diisocyanate» means a compound bearing two isocyanate groups.

The term «diol» means a compound bearing two hydroxyl groups.

The term «hydroxyl-functionalized (meth)acrylate» means a compound comprising one hydroxyl group and at least one (meth)acrylate functional group.

The term «isocyanate group» means a group of formula —N═C═O.

The term «hydroxyl group» means a group of formula —OH.

The term «amino group» means a $—NR_{a1}R_{b1}$ group, wherein $R_{a1}$ and $R_{b1}$ are independently H or an optionally substituted alkyl.

The term «alkyl» means a monovalent saturated acyclic hydrocarbon group of formula $—C_xH_{2x+1}$ wherein x is 1 to 100. An alkyl may be linear or branched. Examples of alkyl groups include methyl, ethyl, propyl, isopropyl, butyl, isobutyl, tert-butyl, pentyl, hexyl, 2-methylbutyl, 2,2-dimethylpropyl, n-hexyl, 2-methylpentyl, 2,2-dimethylbutyl, n-heptyl, 2-ethylhexyl, and the like.

The term «alkenyl» means a monovalent acyclic hydrocarbon group comprising at least one C═C double bond. An alkenyl may be linear or branched.

The term «hydroxyalkyl» means an alkyl substituted with at least one hydroxy group.

The term «aminoalkyl» means an alkyl substituted with at least one amino group.

The term «alkoxyalkyl» means an alkyl substituted with at least one alkoxy group.

The term «cycloalkyl» means a non-aromatic cyclic hydrocarbon group. A cycloalkyl may comprise one or more carbon-carbon double bonds. Examples of cycloalkyl groups include cyclopentyl, cyclohexyl and isobornyl.

The term «heterocycloalkyl» means a cycloalkyl having at least one ring atom that is a heteroatom selected from O, N, or S.

The term «aryl» means an aromatic hydrocarbon group.

The term «heteroaryl» means an aryl having at least one ring atom that is a heteroatom such as O, N, S and mixtures thereof.

The term «alkoxy» means a group of formula —O-Alkyl.

The term «alkylaryl» means an alkyl substituted by an aryl group. An example of an alkylaryl group is benzyl ($—CH_2$-Phenyl).

The term «arylalkyl» means an aryl substituted by an alkyl group.

The term «alkylene» refers to a linker derived from an alkane of formula $C_mH_{2m+2}$ (wherein m is 1 to 200) by removing one hydrogen atom at each point of attachment of the linker.

The term «oxyalkylene» means a linker of formula —R—O— or —O—R—, wherein R is an alkylene. Examples of oxyalkylenes include oxyethylene ($—O—CH_2—CH_2—$), oxypropylene ($—O—CH_2—CH(CH_3)—$ or $—O—CH(CH_3)—CH_2—$) and oxybutylene ($—O—CH_2—CH_2—CH_2—CH_2—$).

The term «linker» means a plurivalent group. A linker may connect at least two moieties of a compound together. For example, a linker that connects two moieties of a compound together may be referred to as a divalent linker.

The term «hydrocarbon linker» means a linker having a carbon backbone chain which may optionally be interrupted by one or more heteroatoms selected from N, O, S, Si and mixtures thereof. A hydrocarbon linker may be aliphatic, cycloaliphatic or aromatic. A hydrocarbon linker may be saturated or unsaturated. A hydrocarbon linker may be optionally substituted.

The term «acyclic compound/group/linker» means a compound/group/linker compound that does not comprise any rings.

The term «cyclic compound/group/linker» means a compound/group/linker that comprises one or more rings.

The term «aliphatic compound/group/linker» means an acyclic compound/group/linker. It may be linear or branched, saturated or unsaturated. It may be substituted by one or more groups, for example selected from alkyl, hydroxyl, halogen (Br, Cl, I), isocyanate, carbonyl, amine, carboxylic acid, —C(═O)—OR', —C(═O)—O—C(═O)—R', each R' being independently a C1-C6 alkyl. It may comprise one or more bonds selected from ether, ester, amide, urethane, urea and mixtures thereof.

The term «cycloaliphatic compound/group/linker» means a compound/group/linker comprising a non-aromatic ring. The non-aromatic ring may have only carbon atoms as the ring atoms (i.e. a cycloalkyl) or it may comprise carbon atoms and one or more heteroatoms selected from N, O and S as ring atoms (i.e. an heterocycloalkyl). It may be substituted by one or more groups as defined for aliphatic compounds and linkers. It may comprise one or more bonds as defined for aliphatic compounds and linkers.

The term «aromatic compound/group/linker» means a compound/group/linker comprising an aromatic ring (i.e. a ring that respects Hückel's aromaticity rule). The aromatic ring may have only carbon atoms as the ring atoms (i.e. an aryl, such as a phenyl) or it may comprise carbon atoms and one or more heteroatoms selected from N, O and S as ring atoms (i.e. an heteroaryl). It may be substituted by one or more groups as defined for aliphatic compounds and linkers. It may comprise one or more bonds as defined for aliphatic compounds and linkers. An araliphatic compound/group/linker (ie. compound/group/linker comprising both an aromatic moiety and an aliphatic moiety) is encompassed by an aromatic compound/group/linker.

The term «saturated compound/group/linker» means a compound/group/linker that does not comprise any double or triple carbon-carbon bonds.

The term «unsaturated compound/group/linker» means a compound/group/linker that comprises a double or triple carbon-carbon bond, in particular a double carbon-carbon bond.

The term «polyol» means a compound comprising at least two hydroxyl groups.

The term «polyether polyol» means a polyol comprising at least two ether bonds.

The term «polyester polyol» means a polyol comprising at least two ester bonds.

The term «polycarbonate polyol» means a polyol comprising at least two carbonate bonds.

The term «polydiene polyol» means a polyol comprising at least two units derived from the polymerization of diene (for example butadiene).

The term «polycaprolactone polyol» means a polyol comprising at least two units derived from the ring-opening polymerization of ε-caprolactone, in particular at least two $-[(CH_2)_5-C(=O)O]-$ units.

The term «polyorganosiloxane polyol» means a polyol comprising at least two organosiloxane bonds. The organosiloxane bond may, for example be a dimethylsiloxane bond.

The term «urethane bond» means a $-NH-C(=O)-O-$ or $-O-C(=O)-NH-$ bond.

The term «ester bond» means a $-C(=O)-O-$ or $-O-C(=O)-$ bond.

The term «ether bond» means a $-O-$ bond.

The term «carbonate bond» means a $-O-C(=O)-O-$ bond.

The term «optionally substituted compound/group/linker» means compound/group/linker optionally substituted by one or more groups selected from halogen, alkyl, cycloalkyl, aryl, heteroaryl, alkoxy, aryloxy, aralkyl, alkaryl, haloalkyl, hydroxyl, thiol, hydroxyalkyl, thioalkyl, thioaryl, alkylthiol, amino, alkylamino, isocyanate, nitrile, amide, carboxylic acid, $-C(=O)-R'-C(=O)-OR'$, $-C(=O)NH-R'$, $-NH-C(=O)R'$, $-O-C(=O)-NH-R'$, $-NH-C(=O)-O-R'$, $-C(=O)-O-C(=O)-R'$ and $-SO_2-NH-R'$, each R' being independently an optionally substituted group selected from alkyl, aryl and alkylaryl.

As used herein, the term "alkoxylated" refers to compounds in which one or more epoxides such as ethylene oxide and/or propylene oxide have been reacted with active hydrogen-containing groups (e.g., hydroxy groups) of a base compound, such as a polyol, to form one or more oxyalkylene moieties. For example, from 1 to 25 moles of epoxide may be reacted per mole of base compound.

Elastic Material

The elastic material in accordance with the invention has an elongation greater than 150% as measured according to ASTM D638-02a, a resiliency greater than 12% as measured according to ASTM D2632-01 (reapproved 2008)), and a Shore A hardness of at least 10 as measured by ASTM D2240-15e1. Such properties may be adjusted and varied as may be desired by selecting and combining various ingredients of the curable composition used to prepare the elastic material, as described hereinafter in more detail. For example, changing the types and relative amounts of substances employed as components a), b) and c) of the curable composition can lead to variations in the elongation, resiliency and Shore A hardness of the elastic material obtained therefrom. The elongation, resiliency and Shore A hardness may be measured as described in the examples.

According to certain embodiments, the elastic material may have an elongation greater than 200%, greater than 250%, or greater than 300% as measured according to ASTM D638-02a.

In other embodiments, the elastic material may have a resiliency greater than 20%, greater than 25%, or greater than 30% as measured according to ASTM D2632-01 (reapproved 2008).

The elastic material, in other embodiments of the invention, may have a Shore A hardness of at least 15 or at least 20 as measured by ASTM D2240-15e1. The Shore A hardness may, for example, be not more than 100, not more than 90, not more than 80, not more than 70, or not more than 60 as measured by ASTM D2240-15e1. For example, the elastic material may have a Shore A hardness of from 20 to 60 as measured by ASTM D2240-15e1.

In certain embodiments, the elastic material of the invention may have little to no tack. For example, the elastic material may have a probe tack of not greater than 4.4 N, not greater than 2.2 N, or not greater than 0.44 N as measured according to ASTM D2979-95 using a ChemInstruments® PT-500 Inverted Probe Machine in the tension-peak mode. The diameter of the PT-500's inverted probe that contacts the sample is 0.197 in. as specified by ASTM D2979-95. 4.4 N corresponds to an instrument readout of 1.000 lb.

The curable composition used to prepare an elastic material in accordance with the present invention is characterized by being a liquid at room temperature (e.g., 25° C.). For example, the curable composition may have a viscosity at 25° C. of not more than 50,000 centipoise, not more than 40,000 centipoise, not more than 30,000 centipoise, or not more than 20,000 centipoise as measured using a rotational Brookfield viscometer. As is known in the art, various ASTM methods (such as ASTM D1084 and ASTM D2556), all of which are quite similar, may be used to measure viscosity using a rotational Brookfield viscometer, with the spindle size being selected to make the torque between 50 and 70%. The particular ASTM method will be selected based upon how viscous the liquid sample is and whether the liquid is Newtonian or non-Newtonian in character, among possibly other factors.

Component a)

The curable composition used to prepare an elastic material in accordance with the invention contains, as component a), one or more (meth)acrylate-functionalized oligomers having no more than two (meth)acrylate functional groups per molecule on average. Any of such oligomers known in the art may be used. However, the number average molecular weight ($M_n$) of component a) as a whole as measured using gel permeation chromatography and polystyrene calibration standards is at least 10,000 Daltons. Thus, if the curable composition contains a single such oligomer, then its $M_n$ should be at least 10,000 Daltons. In embodiments of the invention where the curable composition contains two or more such oligomers, it is possible for one or more of such oligomers to have an $M_n$ of less than 10,000 Daltons, provided that at least one other such oligomer present in the curable composition has an $M_n$ of at least 10,000 Daltons and the $M_n$ of the multiple oligomers when combined in the proportions utilized in the curable composition is at least 10,000 Daltons.

According to various embodiments of the invention, the $M_n$ of component a) is at least 10,000 Daltons, at least 12,500 Daltons, at least 15,000 Daltons, at least 17,500 Daltons, at least 20,000 Daltons, at least 21,000 Daltons, at least 22,000 Daltons or at least 25,000 Daltons. In particular, the $M_n$ of component a) is not greater than 100,000 Daltons, not greater than 75,000 Daltons, or not greater than 50,000 Daltons. For example, the $M_n$ of component a) may be 10,000 to 100,000 Daltons or 12,500 to 75,000 Daltons. In particular, the $M_n$ of component a) may be from 12,000 to 50,000 Daltons, from 12,500 to 50,000 Daltons, from 12,500 to 40,000 Daltons, from 12,500 to 30,000 Daltons or from 15,000 to 30,000 Daltons.

Oligomers suitable for use as component a) in the curable compositions of the present invention may be functionalized solely with acrylate functional groups, solely with methacrylate functional groups, or with both acrylate and methacrylate functional groups (e.g., it is possible to employ an oligomer that contains both acrylate and methacrylate functional groups on the same molecule). For example, it may be advantageous under certain circumstances to employ an oligomer having a molar ratio of acrylate functional groups: methacrylate functional groups of 1:3 to 3:1, 1:2 to 2:1, or 1:1.5 to 1.5:1.

In particular, the oligomer of component a) comprises at least one acrylate group.

Typically, an oligomer may bear (meth)acrylate functional groups at one or more terminal ends of the oligomer molecule, but it is also possible for (meth)acrylate functional groups to be positioned along the backbone of the oligomer. The average (meth)acrylate functionality of the oligomer or of component a) generally may be up to 2 (i.e., an average of 2 (meth)acrylate functional groups per molecule), but in other embodiments the average (meth)acrylate functionality may be less than 2, not more than 1.9, not more than 1.8, not more than 1.7, not more than 1.6, or not more than 1.5. In particular, the average acrylate functionality of the oligomer or of component a) generally may be up to 2 (i.e., an average of 2 acrylate functional groups per molecule), but in other embodiments the average acrylate functionality may be less than 2, not more than 1.9, not more than 1.8, not more than 1.7, not more than 1.6, or not more than 1.5. Generally speaking, the oligomer or combination of oligomers utilized as component a) desirably has an average (meth)acrylate functionality of at least 1, in particular an average acrylate functionality of at least 1.

Suitable oligomers include, but are not limited to, epoxy (meth)acrylate oligomers, urethane (meth)acrylate oligomers, polyester (meth)acrylate oligomers, (meth)acrylic (meth)acrylate oligomers, and amino (meth)acrylate oligomers. The oligomer structure may contain segments characteristic of more than one of the oligomer classes listed above. The oligomer may contain both "hard" and "soft" segments and, further, may be a block copolymer. The oligomer may contain regions where the structure is similar to that of common elastomeric materials (e.g., polyurethane, polyisoprene, polybutadiene, polyisobutylene) or may contain no structural similarities to conventional elastomers.

In certain embodiments of the invention, the oligomer may have a relatively low glass transition temperature (Tg) as measured by differential scanning calorimetry. For example, the oligomer may have a Tg less than 0° C., less than −10° C., less than −20° C., less than −30° C., less than −40° C., less than −50° C., less than −60° C., or less than −70° C.

Examples of suitable epoxy (meth)acrylate oligomers include the reaction products of acrylic or methacrylic acid or mixtures thereof with epoxy-group containing compounds such as glycidyl ethers or esters. The epoxy (meth) acrylate oligomers may be hydroxyl-functional (i.e., contain one or more hydroxyl functional groups as well as one to two (meth)acrylate functional groups per molecule). Suitable hydroxyl-functional epoxy (meth)acrylate oligomers include, but are not limited to, oligomeric compounds obtainable by reaction of an epoxy compound (such as an epoxy resin oligomer or other epoxy-functionalized oligomer) with (meth)acrylic acid wherein ring-opening of the epoxy group by the (meth)acrylic acid introduces both hydroxyl and (meth)acrylate functionality. The starting epoxy compound may, for example, have a number average molecular weight of 10,000 Daltons or higher, such that the epoxy (meth)acrylate oligomer obtained therefrom also has a number average molecular weight of at least 10,000 Daltons. Higher molecular weight oligomers of bisphenol epoxy resins may be utilized, for example. It is also possible to obtain suitably high molecular weight epoxy (meth) acrylate oligomers by functionalizing an oligomer such as a polyoxyalkylene glycol or polybutadiene with one to two epoxy groups and then reacting the epoxy group(s) with (meth)acrylic acid. Examples of suitable hydroxyl-functional epoxy (meth)acrylates include aliphatic epoxy (meth) acrylate oligomers having both (meth)acrylate functionality and secondary hydroxyl functionality due to ring-opening of an epoxy group.

Urethane (meth)acrylate oligomers (also referred to as (meth)acrylate-functionalized polyurethane oligomers) capable of being used in the curable compositions of the present invention include urethanes based on aliphatic and/or aromatic polyester polyols and polyether polyols and aliphatic and/or aromatic polyester diisocyanates and polyether diisocyanates capped with one to two (meth) acrylate end-groups. Suitable urethane (meth)acrylate oligomers include, for example, aliphatic polyester-based urethane mono- and di-acrylate oligomers, aliphatic polyether-based urethane mono- and di-acrylate oligomers, as well as aliphatic polyester/polyether-based urethane mono- and di-acrylate oligomers.

In various embodiments, the urethane (meth)acrylate oligomers may be prepared by reacting aliphatic and/or aromatic diisocyanates with OH group terminated polyester polyols (including aromatic, aliphatic and mixed aliphatic/aromatic polyester polyols), polyether polyols (in particular, polypropylene glycols and/or polytetramethylene glycols), polycarbonate polyols, polycaprolactone polyols, polyorganosiloxane polyols (in particular polydimethysiloxane polyols), or polydiene polyols (in particular polybutadiene polyols), or combinations thereof to form isocyanate-functionalized oligomers which are then reacted with hydroxyl-functionalized (meth)acrylates such as hydroxyalkyl (meth) acrylates (e.g., hydroxyethyl acrylate or hydroxyethyl methacrylate) or polycaprolactone (meth)acrylates to provide one to two terminal (meth)acrylate groups. Other synthetic methods for the preparation of urethane (meth) acrylate oligomers are well known in the art and any of such methods may be used to prepare oligomers suitable for use in component a) of the curable composition, in accordance with the present invention.

Particularly preferred urethane (meth)acrylate oligomers suitable for use in the present invention include oligomers formed by the reaction of polyol(s), diisocyanate(s), and hydroxyl-functionalized (meth)acrylate(s) (such as hydroxyalkyl (meth)acrylate(s) or polycaprolactone (meth) acrylate(s)).

The urethane (meth)acrylate oligomer may comprise a urethane (meth)acrylate oligomer according to the following formula (I):

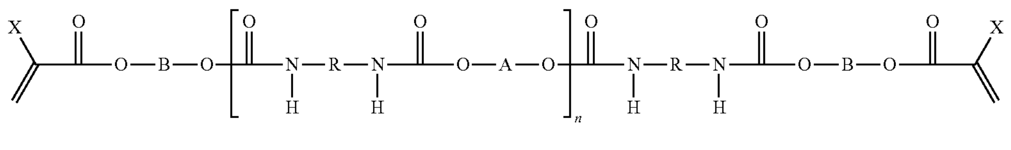

(I)

wherein each A is independently the residue of a polyol;

each R is independently the residue of a diisocyanate;

each B is independently the residue of a hydroxyl-functionalized (meth)acrylate;

each X is independently H or methyl;

n is 1 to 20, preferably 1 to 15, more preferably 1 to 10.

As used herein, the term "residue of a diol" means the moiety between the two hydroxy groups of a diol. Accordingly, A may be the residue of a polyol of formula OH-A-OH.

As used herein, the term "residue of a diisocyanate" means the moiety between the two isocyanate groups of a diisocyanate. Accordingly, R may be the residue of a diisocyanate of formula OCN—R—NCO.

As used herein, the term "residue of a hydroxyl-functionalized meth)acrylate" means the moiety between the (meth) acrylate functional group and a hydroxy group of a hydroxylated mono(meth)acrylate. Accordingly, B may be the residue of a hydroxylated mono(meth)acrylate of formula $CH_2{=}C(X){-}(C{=}O){-}O{-}B{-}OH$ where X is H or methyl.

The urethane (meth)acrylate oligomer may be based on polypropylene glycol. A urethane (meth)acrylate oligomer based on polypropylene glycol refers to a urethane (meth) acrylate oligomer comprising oxypropylene units. The oxypropylene units are preferably contained in the polyol moiety of the urethane (meth)acrylate oligomer. The polyol moiety of the urethane (meth)acrylate oligomer may correspond to moiety A in formula (I). The hydroxyl-functionalized (meth)acrylate moieties are preferably substantially free of oxypropylene units. The hydroxyl-functionalized (meth)acrylate moieties of the urethane (meth)acrylate oligomer may correspond to moiety B in formula (I).

The weight content of oxypropylene units in the urethane (meth)acrylate oligomer may be at least 45% based on the total weight of urethane (meth)acrylate oligomer. In particular, the weight content of oxypropylene units may be from 45 to 95%, from 50% to 95%, from 55% to 95%, from 60% to 95%, from 65% to 95%, from 70% to 95%, from 75% to 95%, from 78% to 95%, from 80% to 95%, based on the total weight of urethane (meth)acrylate oligomer. The weight content of oxypropylene units may be determined by calculating the weight of oxypropylene units in the compounds used to prepare the urethane (meth)acrylate with respect to the total weight of the compounds used to prepare the urethane (meth)acrylate.

The polyol used to prepare the urethane (meth)acrylate oligomer may have a number average molecular weight of at least 2,000 Daltons, at least 3,000 Daltons, at least 4,000 Daltons or at least 5,000 Daltons.

The polyol used to prepare the urethane (meth)acrylate oligomer is preferably selected from a polyether polyol, a polyester polyol, a polycarbonate polyol, a polycaprolactone polyol, a polydimethysiloxane polyol and a polydiene polyol, in particular a polyether polyol.

The polyether polyol may have olefin unsaturation above 0.01 meq/g (milliequivalents of olefin per gram of polyether polyol). For example, the polyether polyol may have olefin unsaturation of 0.015 to 0.05 meq/g or 0.02 to 0.05 meq/g. The unsaturation may be determined in accordance with ASTM method D4671-93 "Polyurethane Raw Materials: Determinations of Unsaturation of Polyols".

The polyether polyol may comprise less than 10%, less than 8%, less than 5%, less than 1%, or even 0%, by weight of ethylene glycol monomeric units based on the weight of the polyether polyol. Alternatively, the polyether polyol may comprise more than 30%, more than 40%, more than 50%, more than 60%, by weight of ethylene glycol monomeric units based on the weight of the polyether polyol.

The polyether polyol may have a number average molecular weight of at least 2,000 Daltons, at least 3,000 Daltons, at least 4,000 Daltons or at least 5,000 Daltons.

The polyether polyol may be selected from a homopolymer or co-polymer of polypropylene glycol, a homopolymer or copolymer of polyethylene glycol and a homopolymer or co-polymer of polytetramethylene glycol. The polyether polyol is preferably selected from a homopolymer of polypropylene glycol, a homopolymer of polyethylene glycol and a homopolymer of polytetramethylene glycol, more preferably a homopolymer of polypropylene glycol or a homopolymer of polytetramethylene glycol, even more preferably a homopolymer of polypropylene glycol.

The diisocyanate used to prepare the urethane (meth) acrylate oligomer may be an aromatic, aliphatic or cycloaliphatic diisocyanate.

Examples of suitable diisocyanates having an aliphatic residue are 1,4-tetramethylene diisocyanate, 1,5-pentamethylene diisocyanate (PDI), 1,6-hexamethylene diisocyanate (HDI), trimethylhexamethylene diisocyanate (TMDI), 1,12-dodecane diisocyanate.

Examples of suitable diisocyanates having an cycloaliphatic residue are 1,3- and 1,4-cyclohexane diisocyanate, isophorone diisocyanate (IPDI corresponding to 3-isocyanatomethyl-3,5,5-trimethylcyclohexylisocyanate), dicyclohexylmethane-4,4'-diisocyanate (HMDI or hydrogenated MDI), 2,4-diisocyanato-1-methylcyclohexane, 2,6-diisocyanato-1-methylcyclohexane.

Examples of suitable diisocyanates having an aromatic residue are 4,4'-methylene diphenyl diisocyanate (MDI), 2,4- and 2,6-toluene diisocyanate (TDI), 1,4-benzene diisocyanate, 1,5-naphtalene diisocyanate (NDI), m-tetramethylene xylylene diisocyanate, 4,6-xylylene diisocyanate.

In a preferred embodiment, the diisocyanate may be an aliphatic or cycloaliphatic diisocyanate, such as a diisocyanate comprising a C4-C12 hydrocarbon chain or one or more cyclohexyl groups. More particularly, the diisocyanate may be cycloaliphatic diisocyanate. Even more particularly, the diisocyanate may be isophorone diisocyanate.

The hydroxyl-functionalized (meth)acrylate may correspond to formula $$CH_2{=}C(X){-}(C{=}O){-}O{-}B{-}OH$$

wherein

B is a divalent linker; and

X is H or methyl.

The hydroxyl-functionalized (meth)acrylate may have a molecular weight of less than 600 g/mol, less than 500 g/mol, less than 400 g/mol, less than 350 g/mol, less than 300 g/mol, less than 250 g/mol, less than 200 g/mol or less than 150 g/mol.

In one embodiment, B may correspond to a hydrocarbon linker containing 2 to 50 carbon atoms, in particular 2 to 10 carbon atoms, more particularly 2 to 6 carbon atoms. The hydrocarbon linker may optionally be substituted by one or more hydroxy groups. The hydrocarbon linker may optionally be interrupted by one or more oxygen atoms. B may optionally comprise one or more oxyalkylene units, in particular no more than 3 oxyalkylene units. The oxyalkylene unit may be selected from oxyethylene, oxypropylene, oxybutylene and mixtures thereof, preferably oxyethylene, oxybutylene and mixtures thereof. In one embodiment, B may be substantially free of oxypropylene units, in particular B may be substantially free of oxyalkylene units.

More particularly, B may correspond to the following formula:

$$\text{-(Alk-O)}_p\text{-(L)}_q\text{-(O-Alk)}_r\text{-}$$

wherein each Alk is independently ethylene, propylene or butylene, preferably ethylene or butylene;

L is a C2-C20 alkylene optionally substituted by one or more hydroxy groups, preferably a C2-C10 alkylene;

p and r are independently from 0 to 3, preferably p and r are both 0;

q is 0 or 1, preferably 1;

the sum p+r is from 0 to 6; preferably 0 to 3;

with the proviso that p, q and r are not all 0.

Examples of such hydroxyl-functionalized (meth)acrylates include 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, 4-hydroxybutyl methacrylate, 5-hydroxypentyl acrylate, 5-hydroxypentyl methacrylate, 6-hydroxyhexyl acrylate, 6-hydroxyhexyl methacrylate, neopentyl glycol monoacrylate, neopentyl glycol monomethacrylate, trimethylolpropane monoacrylate, trimethylolpropane monomethacrylate, triethylolpropane monoacrylate, triethylolpropane monomethacrylate, pentaerythritol monoacrylate, pentaerythritol monomethacrylate, glycerol monoacrylate, glycerol monomethacrylate, diethylene glycol monoacrylate, diethylene glycol monomethacrylate, triethylene glycol monoacrylate, triethylene glycol monomethacrylate, polyethylene glycol monoacrylate, polyethylene glycol monomethacrylate, dipropylene glycol monoacrylate, dipropylene glycol monomethacrylate, tripropylene glycol monoacrylate, tripropylene glycol monomethacrylate, polypropylene glycol monoacrylate, polypropylene glycol monomethacrylate, dibutylene glycol monoacrylate, dibutylene glycol monomethacrylate, tributylene glycol monoacrylate, tributylene glycol monomethacrylate, polybutylene glycol monoacrylate, polybutylene glycol monomethacrylate, the alkoxylated (i.e. ethoxylated and/or propoxylated) derivatives of the above mentioned compounds and mixtures thereof.

The following compounds are particularly preferred: 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, 4-hydroxybutyl methacrylate, 5-hydroxypentyl acrylate, 5-hydroxypentyl methacrylate, 6-hydroxyhexyl acrylate, 6-hydroxyhexyl methacrylate, neopentyl glycol monoacrylate, neopentyl glycol monomethacrylate.

In another embodiment, B may be a residue comprising an ester bond, in particular at least two ester bonds. In particular, B may be a residue comprising polymerized units derived from a lactone, in particular from caprolactone.

More particularly, B may correspond to the following formula;

$$-((CH_2)_5-CO_2)_s-R'-$$

wherein

R' is a C2-C8, preferably a C2-$C_6$, more preferably a C2-C4 alkylene; and s is from 1 to 10, preferably from 2 to 8, more preferably from 3 to 5.

Hydroxyl-functionalized (meth)acrylates comprising polymerized units derived from a lactone may be prepared by reaction of a lactone (preferably ε-caprolactone) with a hydroxyalkyl mono(meth)acrylate (preferably 2-hydroxyethyl acrylate) followed by the ring opening polymerization of said lactone.

Exemplary polyester (meth)acrylate oligomers include the reaction products of acrylic or methacrylic acid or mixtures thereof with hydroxyl group-terminated polyester polyols. The reaction process may be conducted such that all or only a portion of the hydroxyl groups of the polyester polyol have been (meth)acrylated. The polyester polyols can be made by polycondensation reactions of polyhydroxyl functional components (in particular, diols such as glycols and oligoglycols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures. According to preferred embodiments, the polyester polyol used to prepare the polyester (meth)acrylate oligomer has a number average molecular weight of at least 10,000 Daltons, at least 12,500 Daltons, or at least 15,000 Daltons.

Suitable (meth)acrylic (meth)acrylate oligomers (sometimes also referred to in the art as "acrylic oligomers" or "(meth)acrylic oligomers") include oligomers which may be described as substances having an oligomeric acrylic backbone which is functionalized with one or two (meth)acrylate groups (which may be at a terminus of the oligomer or pendant to the acrylic backbone). The (meth)acrylic backbone may be a homopolymer, random copolymer or block copolymer comprised of repeating units of (meth)acrylic monomers. The (meth)acrylic monomers may be any monomeric (meth)acrylate such as C1-C6 alkyl (meth)acrylates as well as functionalized (meth)acrylates such as (meth)acrylates bearing hydroxyl, carboxylic acid and/or epoxy groups. (Meth)acrylic (meth)acrylate oligomers may be prepared using any procedures known in the art, such as by oligomerizing monomers, at least a portion of which are functionalized with hydroxyl, carboxylic acid and/or epoxy groups (e.g., hydroxyalkyl(meth)acrylates, (meth)acrylic acid, glycidyl (meth)acrylate) to obtain a functionalized oligomer intermediate, which is then reacted with one or more (meth) acrylate-containing reactants to introduce the desired (meth) acrylate functional groups.

According to various aspects of the invention, the curable composition used to prepare the elastic material of the invention contains a total of 43 to 89.9% by weight, based on the combined weight of components a), b) and c), of one or more (meth)acrylate-functionalized oligomers having no more than two (meth)acrylate functional groups per molecule on average (i.e., component a) comprises from 43% to 89.9% of the total weight of components a), b), and c)). In certain embodiments, component a) comprises at least 50%, at least 55%, at least 60% or at least 65% by weight of components a), b), and c) combined. In other embodiments, component a) comprises not more than 85%, not more than 80%, or not more than 75% by weight of components a), b), and c) combined. For example, in certain embodiments the curable composition may comprise 65 to 75% by weight or 70 to 75% by weight in total of such oligomers, based on the combined weight of components a), b), and c).

Component b)

The curable composition used to prepare an elastic material in accordance with the invention contains, as component b), one or more mono(meth)acrylate-functionalized monomers having a molecular weight of less than 500 Daltons and a single (meth)acrylate functional group per molecule and/or one or more ethylenically unsaturated nitrogen-containing monomers.

The curable composition used to prepare an elastic material in accordance with the invention may contain, as component b), one or more mono(meth)acrylate-functionalized monomers having a molecular weight of less than 500 Daltons and a single (meth)acrylate functional group per molecule. Such compounds may also be referred to herein as "monofunctional (meth)acrylate monomer diluents." Any of such compounds known in the art may be used.

Examples of suitable monofunctional (meth)acrylate monomer diluents include, but are not limited to, mono-(meth)acrylate esters of aliphatic alcohols (wherein the aliphatic alcohol may be straight chain, branched or alicyclic and may be a mono-alcohol, a di-alcohol or a polyalcohol, provided only one hydroxyl group is esterified with (meth) acrylic acid); mono-(meth)acrylate esters of aromatic alcohols (such as phenols, including alkylated phenols); mono-(meth)acrylate esters of alkylaryl alcohols (such as benzyl alcohol); mono-(meth)acrylate esters of glycols such as diethylene glycol, triethylene glycol, dipropylene glycol, tripropylene glycol, polyethylene glycol, and polypropylene glycol); mono-(meth)acrylate esters of monoalkyl ethers of glycols; mono-(meth)acrylate esters of alkoxylated (e.g., ethoxylated and/or propoxylated) aliphatic alcohols (wherein the aliphatic alcohol may be straight chain, branched or alicyclic and may be a mono-alcohol, a di-alcohol or a polyalcohol, provided only one hydroxyl group of the alkoxylated aliphatic alcohol is esterified with (meth) acrylic acid); mono-(meth)acrylate esters of alkoxylated (e.g., ethoxylated and/or propoxylated) aromatic alcohols (such as alkoxylated phenols); caprolactone mono(meth) acrylates; and the like.

Exemplary monofunctional (meth)acrylate monomer diluents include, but are not limited to, tetrahydrofurfuryl (meth)acrylate, alkoxylated tetrahydrofurfuryl (meth)acrylate, 4-tert-butylcyclohexyl (meth)acrylate, 2(2-hydroxy) ethyl (meth)acrylate, diethyleneglycol methyl ether (meth) acrylate, 2-phenoxyethyl (meth)acrylate, glycidyl (meth) acrylate, ethoxylated phenol (meth)acrylate, ethoxylated nonylphenol (meth)acrylate, methoxy polyethylene glycol mono(meth)acrylate, polypropyleneglycol mono(meth) acrylate, cyclic trimethylolpropane formyl (meth)acrylate, ethoxytriglycol (meth)acrylate, stearyl (meth)acrylate, lauryl (meth)acrylate, alkoxylated lauryl acrylate, ethoxylated cetyl/stearyl (meth)acrylate, alkoxylated phenol acrylate, isobornyl (meth)acrylate, 3,3,5-trimethyl cyclohexyl (meth) acrylate, dicyclopentadienyl (meth)acrylate, allyl (meth) acrylate, propoxylated allyl (meth)acrylate, caprolactone (meth)acrylate, polyoxyethylene p-cumylphenyl ether (meth)acrylate, isooctyl (meth)acrylate, isodecyl (meth) acrylate, tridecyl (meth)acrylate, tetradecyl (meth)acrylate, $C_{12}$-$C_{14}$ alkyl (meth)acrylate, and behenyl (meth)acrylate.

The monofunctional (meth)acrylate monomer of component b) may be selected such that it exhibits a Hansen Solubility Parameter Distance Relative Energy Difference with the (meth)acrylate-functionalized oligomer of component a) of at least 3 $MPa^{1/2}$. For example, the Hansen Solubility Parameter Distance Relative Energy Difference between the monofunctional (meth)acrylate monomer and the (meth)acrylate-functionalized oligomer may be from 3 to 10 $MPa^{1/2}$, from 3 to 9 $MPa^{1/2}$ or from 3 to 8 $MPa^{1/2}$.

Hansen solubility parameters consist of three parameters representing forces acting between molecules of a substance (dispersion forces, polar intermediate forces, and hydrogen bonding forces and can be calculated according to the approach proposed by Charles Hansen in the work with the title "Hansen Solubility Parameters: A User's Handbook," Second Edition (2007) Boca Raton, Fla.: CRC Press. ISBN 978-O-8493-7248-3. According to this approach, three parameters, called "Hansen parameters": $\delta_d$, $\delta_p$, and $\delta_h$, are sufficient for predicting the behavior of a solvent with respect to a given molecule. The parameter $\delta_d$, in $MPa^{1/2}$, quantifies the energy of the forces of dispersion between the molecules, i.e., the van der Waals forces. The parameter $\delta_p$, in $MPa^{1/2}$, represents the energy of the intermolecular dipolar interactions. Finally, the parameter $\delta_h$, in $MPa^{1/2}$, quantifies the energy derived from the intermolecular hydrogen bonds, i.e., the capacity to interact via a hydrogen bond. The sum of the squares of the three parameters corresponds to the square of the Hildebrand solubility parameter ($\delta_{tot}$).

The three Hansen solubility parameters define a three-dimensional Hansen space. The three Hansen solubility parameters of a material are coordinates in the Hansen space. Thus, the Hansen solubility parameters of a material determine the relative position of the material in the Hansen space. The Hansen solubility parameters of a mixture of a plurality of components are a volume-weighted combination of the Hansen solubility parameters of the individual components making up the mixture. Thus, a mixture of a plurality of components also has a relative position in Hansen space. A Hansen Solubility Parameter Distance (Ra) is a distance in Hansen space between any two materials. The Ra may be determined from Equation 1 below:

$$Ra=4(\delta_{d2}-\delta_{d1})^2+(\delta_{p2}-\delta_{p1})^2+(\delta_{h2}-\delta_{h1})^2 \quad \text{(Equation 1)}$$

wherein $\delta_{d1}$, $\delta_{p1}$, and $\delta_{h1}$ are the dispersion, polar, and hydrogen bonding Hansen solubility parameters, respectively, of one of the two components and $\delta_{d2}$, $\delta_{p2}$, and $\delta_{h2}$ are the dispersion, polar, and hydrogen bonding Hansen solubility parameters, respectively, of the other of the two components. The values of the Hansen solubility parameters for a particular component may be determined empirically or may be found in published tables.

In accordance with certain embodiments of the invention, at least 50%, at least 60%, at least 70%, at least 80%, at least 90%, or at least 95% of the (meth)acrylate functional groups in component b) are acrylate functional groups (the balance, if any, being methacrylate functional groups). According to one embodiment, all of the functional groups in component b) are acrylate functional groups.

According to certain embodiments of the invention, component b) contains at least one high Tg monofunctional monomer and at least one low Tg monofunctional monomer. As used herein, “high Tg monofunctional monomer” refers to a monofunctional (meth)acrylate monomer diluent that when homopolymerized produces a polymer having a glass transition temperature (as measured by differential scanning calorimetry) of greater than 25° C. and “low Tg monofunctional monomer” refers to a monofunctional (meth)acrylate monomer diluent that when homopolymerized produces a polymer having a glass transition temperature (as measured by differential scanning calorimetry) of less than 25° C.

The high Tg monofunctional monomer may, for example, produce a polymer when homopolymerized having a Tg of at least 30° C., at least 40° C., at least 50° C., at least 60° C., at least 70° C., or at least 75° C. Isobornyl acrylate is an example of a high Tg monofunctional monomer. The low Tg monofunctional monomer may, for example, produce a polymer when homopolymerized having a Tg of not more than 10° C., not more than 0° C., not more than −10° C., not more than −20° C., or not more than −25° C. 2(2-Ethoxyethoxy) ethyl acrylate is an example of a low Tg monofunctional monomer. In certain embodiments, the difference in such glass transition temperatures (i.e., the difference between the Tg of the high Tg monofunctional monomer when homopolymerized and the Tg of the low Tg monofunctional monomer) is at least 50° C., at least 60° C., at least 70° C., at least 80° C., at least 90° C. or at least 100° C.

The relative amounts of the high and low Tg monofunctional monomers in the curable composition may be varied as may be desired depending upon, for example, the properties of the oligomer(s) also present in the curable composition and the properties (e.g., hardness) desired in the elastic material obtained from the curable composition. Generally speaking, however, the mass ratio of high Tg monofunctional monomer(s) to low Tg monofunctional monomer(s) in the curable composition may suitably be from 1:10 to 10:1, from 1:5 to 5:1, from 1:4 to 4:1, from 1:3 to 3:1, or from 1:2 to 2:1. Generally speaking, the Shore A hardness of the elastic material may be increased by increasing the amount of high Tg monofunctional monomer relative to the amount of low Tg monofunctional monomer, if all other attributes of the curable composition are held constant.

In a preferred embodiment, component b) comprises a monofunctional monomer selected from a sterically-hindered monofunctional (meth)acrylate monomer, an ethylenically unsaturated nitrogen-containing monomer and mixtures thereof.

Component b) may comprise at least one sterically-hindered monofunctional (meth)acrylate monomer. Component b) may comprise a mixture of sterically-hindered monofunctional (meth)acrylate monomers.

A sterically-hindered monofunctional (meth)acrylate monomer may comprise a cyclic moiety and/or a tert-butyl group. The cyclic moiety may be monocyclic, bicyclic or tricyclic, including bridged, fused and/or spirocyclic ring systems. The cyclic moiety may be carbocyclic (all of the ring atoms are carbons), or heterocyclic (the rings atoms consist of at least two elements). The cyclic moiety may be aliphatic, aromatic or a combination of aliphatic and aromatic. In particular, the cyclic moiety may comprise a ring or ring system selected from cycloalkyl, heterocycloalkyl, aryl, heteroaryl and combinations thereof. More particularly, the cyclic moiety may comprise a ring or ring system selected from phenyl, cyclopentyl, cyclohexyl, norbornyl, tricyclodecanyl, dicyclopentadienyl, oxiranyl, oxetanyl, tetrahydrofuranyl, tetrahydropyranyl, dioxolanyl, dioxanyl, dioxaspirodecanyl and dioxaspiroundecanyl. The ring or ring system may be optionally substituted by one or more groups selected from hydroxyl, alkoxy, alkyl, hydroxyalkyl, cycloalkyl, aryl, alkylaryl and arylalkyl.

In particular, the cyclic moiety may correspond to one of the following formulae:

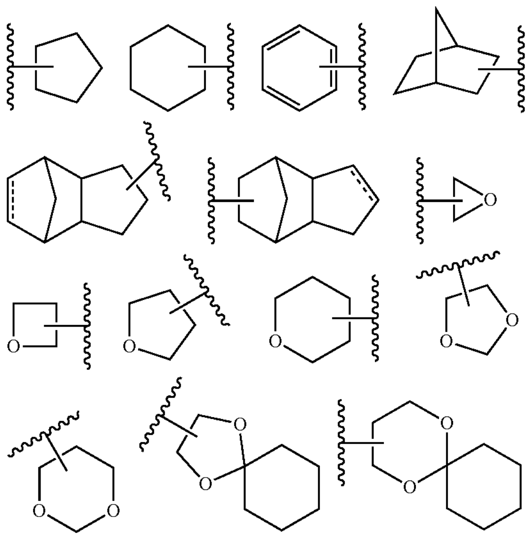

wherein the symbol  represent the point of attachment to a moiety comprising a (meth)acrylate group, the hashed bond  represents a single bond or a double bond;

and each ring atom may be optionally substituted by one or more groups selected from hydroxyl, alkoxy, alkyl, hydroxyalkyl, cycloalkyl, aryl, alkylaryl and arylalkyl.

Particularly preferred cyclic moieties correspond to one of the following formulae:

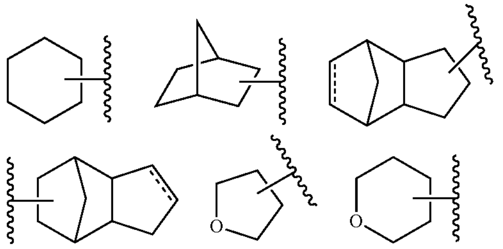

-continued

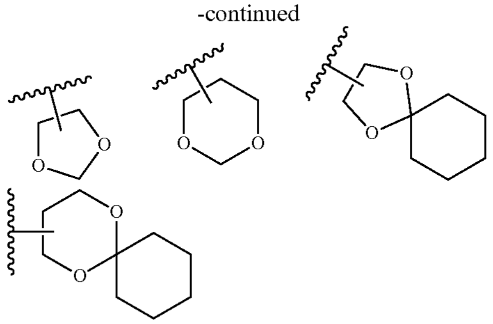

Examples of suitable sterically-hindered monofunctional (meth)acrylate monomers include tert-butyl (meth)acrylate, 2-phenoxyethyl (meth)acrylate, benzyl (meth)acrylate, isobornyl (meth)acrylate, tert-butyl cyclohexyl (meth)acrylate, 3,3,5-trimethyl cyclohexyl (meth)acrylate, dicyclopentadienyl (meth)acrylate, tricyclodecane methanol mono (meth)acrylate, tetrahydrofurfuryl (meth)acrylate, cyclic trimethylolpropane formyl (meth)acrylate (also referred to as 5-ethyl-1,3-dioxan-5-yl)methyl (meth)acrylate), (2,2-dimethyl-1,3-dioxolan-4-yl)methyl (meth)acrylate, (2-ethyl-2-methyl-1,3-dioxolan yl)methyl (meth)acrylate, glycerol formal methacrylate, the alkoxylated derivatives thereof and mixtures thereof.

Preferred examples of sterically-hindered monofunctional (meth)acrylate monomers include tert-butyl (meth)acrylate, isobornyl (meth)acrylate, tert-butyl cyclohexyl (meth)acrylate, 3,3,5-trimethyl cyclohexyl (meth)acrylate, dicyclopentadienyl (meth)acrylate, tricyclodecane methanol mono (meth)acrylate, tetrahydrofurfuryl (meth)acrylate, cyclic trimethylolpropane formyl (meth)acrylate (also referred to as 5-ethyl-1,3-dioxan-5-yl)methyl (meth)acrylate), (2,2-dimethyl-1,3-dioxolan-4-yl)methyl (meth)acrylate, (2-ethyl-2-methyl-1,3-dioxolan-4-yl)methyl (meth)acrylate, glycerol formal methacrylate, the alkoxylated derivatives thereof and mixtures thereof.

In particular, the sterically-hindered monofunctional (meth)acrylate monomer may represent at least 10%, from 10 to 100%, from 20 to 100%, from 30 to 100%, from 40 to 100%, from 50 to 100%, from 60 to 100%, from 70 to 100%, from 80 to 100%, from 90 to 100%, or even 100% by weight of the total weight of component b).

Component b) may comprise an ethylenically unsaturated nitrogen-containing monomer. Component b) may comprise a mixture of ethylenically unsaturated nitrogen-containing monomers.

The presence of an ethylenically unsaturated nitrogen-containing monomer may advantageously enhance the adhesion of the cured material to the substrate on which it is cured.

An ethylenically unsaturated nitrogen-containing monomer comprises an ethylenically unsaturated functionality and a nitrogen-containing group. The ethylenically unsaturated nitrogen-containing monomer may have a molecular weight of less than 500 Daltons and a single ethylenically unsaturated functionality per molecule.

The ethylenically unsaturated functionality may be a group comprising a polymerizable carbon-carbon double bond. A polymerizable carbon-carbon double bond is a carbon-carbon double bond that can react with another carbon-carbon double bond in a polymerization reaction. A polymerizable carbon-carbon double bond is generally comprised in a group selected from acryloyl, methacryloyl and alkenyl (such as vinyl, allyl, propen-1-yl, butenyl, pentenyl, hexenyl), preferably selected from acryloyl, methacryloyl and vinyl. The carbon-carbon double bonds of an aromatic or heteroaromatic ring are not considered as polymerizable carbon-carbon double bonds.

The nitrogen-containing group of the monomer may have any suitable chemical configuration. The nitrogen-containing group may have a cyclic structure or an acyclic structure. In many suitable cyclic nitrogen-containing groups, nitrogen is one of the ring atoms of the cyclic structure. Exemplary cyclic groups that contain a nitrogen ring atom include, but are not limited to, a pyrrolidonyl group, a pyrrolyl group, a pyrazolyl group, an imidazolyl group, a pyridinyl group, a pyridazinyl group, a pyrimidinyl group, a piperidinyl group, a pyrazinyl group, a piperazinyl group, a piperidonyl group, a triazinyl group, a caprolactamyl group, a carbazolyl group, a morpholinyl group and a succinimidyl group.

The ethylenically unsaturated functionality may be directly or indirectly, preferably directly, attached to a nitrogen atom of the nitrogen-containing group.

In particular, the ethylenically unsaturated nitrogen-containing monomer may correspond to one of the following formulae:

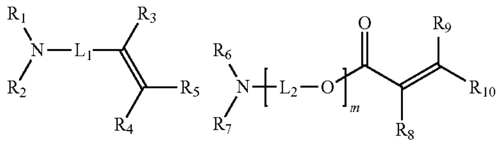

wherein $R_1$ and $R_2$ are independently selected from H, alkyl, aryl and —C(=O)—$R_{11}$; or $R_1$ and $R_2$ may form, with the nitrogen atom to which they are attached, a 4 to 10-membered ring;

$R_6$ and $R_7$ are independently selected from H, alkyl, aryl, -$L_3$-C(=O)—$R_{12}$, cycloalkyl, aminoalkyl and alkoxyalkyl; or $R_6$ and $R_7$ may form, with the nitrogen atom to which they are attached, a 4 to 10-membered ring;

$R_3$, $R_4$, $R_5$ $R_8$, $R_9$ and $R_{10}$ are independently selected from H, alkyl and Cl;

$R_{11}$ and $R_{12}$ are independently H or alkyl;

$L_1$ is bond or alkylene, preferably bond or methylene;

$L_2$ and $L_3$ are independently alkylene;

m is 0 or 1, preferably 0.

The ethylenically unsaturated nitrogen-containing monomer may comprise an alkenyl group (in particular a vinyl group or an allyl group) attached to a cyclic nitrogen-containing group, preferably directly attached to a nitrogen atom which is a ring atom of the cyclic nitrogen-containing group. Suitable examples thereof include, but are not limited to: N-vinylcarbazole, N-allylcarbazole, N-butenylcarbazole, N-hexenylcarbazole, N-vinylsuccinimide, N-vinylimidazole, N-allylimidazole, N-vinyl-2-methylimidazole, N-vinyl-2-ethylimidazole, N-vinyl-2-phenylimidazole, N-vinyl-2,4-dimethylimidazole, N-vinylbenzimidazole, N-vinylimidazoline, N-vinyl-2-methylimidazoline, N-vinyl-2-phenylimidazoline, N-vinylpiperidine, N-allylpiperidine, N-vinyl-2-pyrrolidone, N-allylpyrrolidone, N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-2-piperidone; N-vinyl-6-methyl- 2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinylcaprolactam, N-allylcaprolactam, N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; and N-vinyl-5-isopropyl-7-methyl caprolactam, N-vinylcapryllactam.

The ethylenically unsaturated nitrogen-containing monomer may comprise an alkenyl group (in particular a vinyl group or an allyl group) attached to an acyclic nitrogen-containing group, preferably directly attached to a nitrogen atom of the acyclic nitrogen-containing group. Examples thereof include, but are not limited to: N-vinyl acetamide; N-propenylacetamide; N-(2-methylpropenyl)acetamide; N-vinyl formamide; N-(2,2-dichloro-vinyl)-propionamide; N-vinyl-N-methyl acetamide; and N-vinyl-N-propyl propionamide.

The ethylenically unsaturated nitrogen-containing monomer may comprise an (meth)acryloyl group attached to a cyclic nitrogen-containing group, preferably directly attached to a nitrogen atom which is a ring atom of the cyclic nitrogen-containing group. Suitable examples thereof include, but are not limited to: N-(meth)acryloyl pyrrolidone; N-(meth)acryloyl caprolactam; N-(meth)acryloyl piperidone; ethyl (meth)acryloyl pyrrolidone; methyl (meth) acryloyl pyrrolidone; ethyl (meth)acryloyl caprolactam; methyl (meth)acryloyl caprolactam, 4-(meth)acryloyl morpholine.

The ethylenically unsaturated nitrogen-containing monomer may comprise an (meth)acryloyl group attached to an acyclic nitrogen-containing group, preferably directly attached to a nitrogen atom of the acyclic nitrogen-containing group. Examples thereof include, but are not limited to: (meth)acrylamide; N-methyl (meth)acrylamide; N-ethyl (meth)acrylamide; isopropyl (meth)acrylamide; N,N-diethyl (meth)acrylamide; N-cyclohexyl (meth)acrylamide, N-cyclopentyl (meth)acrylamide; N-butoxymethyl (meth)acrylamide; N,N-dibutyl (meth)acrylamide; N-butyl (meth)acrylamide; diacetone (meth)acrylamide; N—(N,N-dimethylamino)ethyl (meth)acrylamide; N, -(N,N-dimethylamino)propyl (meth)acrylamide, N,N-diethyl (meth)acrylamide; N,N-dimethyl (meth)acrylamide; N-octyl (meth)acrylamide; N-decyl (meth)acrylamide; N-dodecyl (meth)acrylamide; N-octadecyl (meth)acrylamide; N-isopropyl (meth)acrylamide; N-tert-butyl (meth)acrylamide; N-isobutyl (meth)acrylamide, N,N,3,3-tetramethylacrylamide; N-methylol (meth)acrylamide; N-[2-hydroxyethyl] (meth)acrylamide; N-phenyl (meth)acrylamide; trichloroacrylamide; 2-dimethylaminoethyl (meth)acrylate, 2-diethylaminoethyl (meth)acrylate, 3-dimethylamino-2,2-dimethylpropyl-1-(meth)acrylate, 3-diethylamino-2,2-dimethylpropyl-1-(meth)acrylate, 2-morpholinoethyl (meth) acrylate, 2-tert-butylaminoethyl (meth)acrylate, 3-(dimethylamino)propyl (meth)acrylate, 2-(dimethylaminoethoxyethyl) (meth)acrylate.

In particular, the ethylenically unsaturated nitrogen-containing monomer may represent at least 10%, from 10 to 100%, from 20 to 100%, from 30 to 100%, from 40 to 100%, from 50 to 100%, from 60 to 100%, from 70 to 100%, from 80 to 100%, from 90 to 100%, or even 100% by weight of the total weight of component b).

In a particularly preferred embodiment, component b) comprises at least 10% by weight of a monofunctional monomer selected from a sterically-hindered monofunctional (meth)acrylate monomer, an ethylenically unsaturated nitrogen-containing monomer and mixtures thereof. For example, component b) may comprise from 10 to 100%, from 20 to 100%, from 30 to 100%, from 40 to 100%, from 50 to 100%, from 60 to 100%, from 70 to 100%, from 80 to 100%, from 90 to 100%, or even 100% by weight of a monofunctional monomer selected from a sterically-hindered monofunctional (meth)acrylate monomer, an ethylenically unsaturated nitrogen-containing monomer and mixtures thereof, based on the total weight of component b).

Component b) may include one or more monofunctional (meth)acrylate monomers that function as adhesion promoters. An adhesion promoter is a substance that may improve the adhesion of the elastic material obtained from the curable composition to a substrate (in particular a surface of a substrate). Exemplary (meth)acrylate-functionalized adhesion promoters include, but are not limited to, (meth) acrylated (meth)acrylic acid esters, (meth)acrylated sulfuric acid esters, (meth)acrylated phosphoric acid esters, and any other (meth)acrylated organic acid, (meth)acrylated inorganic acid and (meth)acrylated silanes.

According to various aspects of the invention, the curable composition used to prepare the elastic material of the invention contains a total of 10 to 55% by weight, based on the combined weight of components a), b) and c), of one or more monofunctional (meth)acrylate monomer diluents. That is, component b) may comprise 10 to 55% by weight of the total weight of components a), b) and c) combined. According to certain embodiments, the curable composition contains a total of at least 12%, at least 15%, or at least 18% and/or not more than 35% or not more than 30% by weight in total of monofunctional (meth)acrylate monomer diluents. For example, in certain embodiments the curable composition may comprise 18 to 30% by weight or 18 to 25% by weight in total of such monofunctional (meth)acrylate monomer diluents.

Component c)

The curable composition used to prepare an elastic material in accordance with the invention contains, as component c), one or more multi(meth)acrylate-functionalized monomers having a molecular weight of less than 1000 Daltons and at least two (meth)acrylate functional groups per molecule. Such monomers may function as crosslinking agents during curing of the curable composition to form an elastic material in accordance with aspects of the invention. Any of such compounds known in the art may be used. The multi (meth)acrylate-functionalized monomer may contain two, three, four, five or more (meth)acrylate functional groups per molecule, for example. The multi(meth)acrylate-functionalized monomer preferably contains two (meth)acrylate functional groups per molecule. Although the functional groups may be solely acrylate functional groups, solely methacrylate functional groups or both acrylate and methacrylate functional groups, in certain embodiments of the invention, at least 50%, at least 60%, at least 70%, at least 80%, at least 90%, or at least 95% of the (meth)acrylate functional groups in component c) are acrylate functional groups (the balance, if any, being methacrylate functional groups). According to one embodiment, all of the functional groups in component c) are acrylate functional groups.

Suitable multi(meth)acrylate-functionalized monomers include (meth)acrylates of polyols and alkoxylated polyols, provided that two or more of the alcohol groups on the polyol or alkoxylated polyol have been esterified with (meth)acrylic acid.

Component c) may comprise, consist essentially of, or consist of one or more di(meth)acrylate-functionalized monomers, in particular one or more diacrylate-functionalized monomers.

Examples of suitable di(meth)acrylate-functionalized monomers include: di(meth)acrylates of ethylene glycol, diethylene glycol, triethylene glycol, and tetraethylene glycol (e.g., tetraethylene glycol di(meth)acrylate); di(meth) acrylates of polyethylene glycols, wherein the polyethylene glycols have a number average molecular weight of 150 to 250 Daltons (e.g., polyethylene glycol di(meth)acrylates); di(meth)acrylates of 1,4-butanediol (e.g., 1,4-butanediol di(meth)acrylates); (meth)acrylates of 1,6-hexane diol (e.g., 1,6-hexane diol di(meth)acrylates); di(meth)acrylates of neopentyl glycol (e.g., neopentyl glycol di(meth)acrylate); di(meth)acrylates of 1,3-butylene glycol (e.g., 1,3-butylene glycol di(meth)acrylates); di(meth)acrylates of ethoxylated bisphenol A containing 1 to 25 oxyethylene units per molecule (e.g., bisphenol A ethoxylated with from 1 to 35 equivalents of ethylene oxide and then (meth)acrylated); and combinations thereof.

In particular, the di(meth)acrylate-functionalized monomer may be selected from ethoxylated bisphenol A dimethacrylate, triethylene glycol dimethacrylate, ethylene glycol dimethacrylate, tetraethylene glycol dimethacrylate, polyethylene glycol dimethacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol (600) dimethacrylate, polyethylene glycol (200) diacrylate, 1,12-dodecanediol dimethacrylate, tetraethylene glycol diacrylate, triethylene glycol diacrylate, 1,3-butylene glycol dimethacrylate, tripropylene glycol diacrylate, polybutadiene diacrylate, methyl pentanediol diacrylate, polyethylene glycol (400) diacrylate, ethoxylated$_2$ bisphenol A dimethacrylate, ethoxylated$_3$ bisphenol A dimethacrylate, ethoxylated$_3$ bisphenol A diacrylate, cyclohexane dimethanol dimethacrylate, cyclohexane dimethanol diacrylate, ethoxylated$_{10}$ bisphenol A dimethacrylate, dipropylene glycol diacrylate, acrylic ester, ethoxylated$_4$ bisphenol A dimethacrylate, ethoxylated$_6$ bisphenol A dimethacrylate, ethoxylated$_8$ bisphenol A dimethacrylate, alkoxylated hexanediol diacrylate, alkoxylated cyclohexane dimethanol diacrylate, dodecane diacrylate, ethoxylated$_4$ bisphenol A diacrylate, ethoxylated$_{10}$ bisphenol A diacrylate, polyethylene glycol (400) dimethacrylate, NPG-hydroxypivaldehyde adipic acid, polypropylene glycol (400) dimethacrylate, metallic diacrylate, modified metallic diacrylate, metallic dimethacrylate, methacrylated polybutadiene, propoxylated$_2$ neopentyl glycol diacrylate, ethoxylated$_{30}$ bisphenol A dimethacrylate, ethoxylated$_{30}$ bisphenol A diacrylate, alkoxylated neopentyl glycol diacrylate, polyethylene glycol dimethacrylate, 1,3-butylene glycol diacrylate, 1,6 hexanediol diacrylate, 1,6-hexanediol diacrylate, ethoxylated$_2$ bisphenol A dimethacrylate, dipropylene glycol diacrylate, ethoxylated$_4$ bisphenol A diacrylate, polyethylene glycol (600) diacrylate, tricyclodecane dimethanol diacrylate, propoxylated$_2$ neopentyl glycol diacrylate, alkoxylated aliphatic diacrylate and combinations thereof.

In particular, the di(meth)acrylate-functionalized monomer may represent at least 20%, from 20 to 100%, from 30 to 100%, from 40 to 100%, from 50 to 100%, from 60 to 100%, from 70 to 100%, from 80 to 100%, from 90 to 100%, or even 100% by weight of the total weight of component c).

The curable composition may comprise 2-10%, in particular 3-8%, more particularly 4-6%, by weight of di(meth) acrylate-functionalized monomer, based on the total weight of components a), b) and c).

Component c) may comprise one or more (meth)acrylate-functionalized compounds comprising three or more (meth) acrylate functional groups per molecule.

The (meth)acrylate-functionalized compounds comprising three or more (meth)acrylate functional groups per molecule may be (meth)acrylate esters of polyols (polyhydric alcohols) or alkoxylated polyols containing three or more hydroxyl groups per molecule, provided that at least three of the hydroxyl groups are (meth)acrylated.

Specific examples of suitable polyols include glycerin, alkoxylated glycerin, trimethylolpropane, alkoxylated trimethylolpropane, ditrimethylolpropane, alkoxylated ditrimethylolpropane, pentaerythritol, alkoxylated pentaerythritol, dipentaerythritol, alkoxylated dipentaerythritol, sugar alcohols and alkoxylated sugar alcohols. Such polyols may be fully or partially esterified (with (meth)acrylic acid, (meth) acrylic anhydride, (meth)acryloyl chloride or the like), provided the product obtained therefrom contains at least three (meth)acrylate functional groups per molecule. As used herein, the term "alkoxylated" refers to compounds in which one or more epoxides such as ethylene oxide and/or propylene oxide have been reacted with active hydrogen-containing groups (e.g., hydroxyl groups) of a base compound, such as a polyol, to form one or more oxyalkylene moieties. For example, from 1 to 25 moles of epoxide may be reacted per mole of base compound.

Exemplary (meth)acrylate-functionalized compounds containing three or more (meth)acrylate functional groups per molecule may include trimethylolpropane triacrylate; propoxylated trimethylolpropane triacrylate; ethoxylated trimethylolpropane triacrylate; tris (2-hydroxyethyl) isocyanurate triacrylate; pentaerythritol triacrylate; ethoxylated pentaerythritol triacrylate; propoxylated pentaerythritol triacrylate, glyceryl triacrylate, ethoxylated glyceryl triacrylate, propoxylated glyceryl triacrylate; di-trimethylolpropane tetraacrylate; ethoxylated di-trimethylolpropane tetraacrylate; propoxylated di-trimethylolpropane tetraacrylate; pentaerythritol tetraacrylate; ethoxylated pentaerythritol tetraacrylate; propoxylated pentaerythritol tetraacrylate; dipentaerythritol pentaacrylate; ethoxylated dipentaerythritol pentaacrylate; propoxylated dipentaerythritol pentaacrylate; and combinations thereof.

Preferred crosslinking monomers can be of di-, tri-, or greater functionality, preferably difunctionality, but the loading must be adjusted accordingly. Generally speaking, the higher the average functionality of component c), relatively lower amounts of such crosslinking monomers are preferred. If only difunctional crosslinking monomers are used, for example, it is preferred to employ a loading of 2-10%, in particular 3-8%, more particularly 4-6%, by weight, based on the total weight of components a), b) and c). As another example, if only trifunctional crosslinking monomers are present in component c), preferred loadings include the range of 0.1-4% by weight based on the total weight of components a), b) and c), and even smaller loading ranges are preferred for more highly functionalized crosslinking monomers.

Component d)

The curable composition used to prepare an elastic material in accordance with the present invention may also optionally comprise an initiator system as component d).

The initiator system includes one or more substances capable of initiating curing (polymerization) of components a), b) and c) (independently or in cooperation with other substances), typically in response to external stimuli such as heat or light. For example, the curable composition may comprise one or more photoinitiator(s) for the purpose of initiating the polymerization of the (meth)acrylate-functionalized components of the curable composition upon exposure to light. Photoinitiator(s) will advantageously be included whenever the curable composition is intended to be polymerized by ultraviolet (UV) or visible actinic radiation (i. e, cured by UV bulb or an LED). Curable compositions intended to be polymerized by electron beam (EB) will usually not comprise a photoinitiator. An exemplary curable composition may contain, for example, 0-20%, 0-15%, 0-10% or 0-5% by weight photoinitiator, based on the total weight of the curable composition. The curable composition may comprise, for example, at least 0.01%, at least 0.05%, at least 0.1%, or at least 0.5% by weight of photoinitiator, based on the total weight of the curable composition. Preferred photoinitiators are those that are capable of absorbing frequencies of light emitted by the desired energy source, as is ordinary knowledge in the industry.

A photoinitiator may be considered any type of substance that, upon exposure to radiation (e.g., actinic radiation), forms species that initiate the reaction and curing of polymerizable organic substances present in the curable composition. Suitable photoinitiators include free radical photoinitiators. The photoinitiator should be selected so that it is susceptible to activation by photons of the wavelength associated with the actinic radiation (e.g., ultraviolet radiation, visible light) intended to be used to cure the photocurable composition.

Free radical polymerization initiators are substances that form free radicals when irradiated.

Non-limiting types of free radical photoinitiators suitable for use in the curable compositions employed in the present invention include, for example, benzoins, benzoin ethers, acetophenones, benzyl, benzyl ketals, anthraquinones, phosphine oxides, α-hydroxyketones, phenylglyoxylates, α-aminoketones, benzophenones, thioxanthones, xanthones, acridine derivatives, phenazene derivatives, quinoxaline derivatives and triazine compounds. Examples of particular suitable free radical photoinitiators include, but are not limited to, 2-methylanthraquinone, 2-ethylanthraquinone, 2-chloroanthraquinone, 2-benzyanthraquinone, 2-t-butylanthraquinone, 1,2-benzo-9,10-anthraquinone, benzyl, benzoins, benzoin ethers, benzoin, benzoin methyl ether, benzoin ethyl ether, benzoin isopropyl ether, alpha-methylbenzoin, alpha-phenylbenzoin, Michler's ketone, acetophenones such as 2,2-dialkoxybenzophenones and 1-hydroxyphenyl ketones, benzophenone, 4,4'-bis-(diethylamino) benzophenone, acetophenone, 2,2-diethyloxyacetophenone, diethyloxyacetophenone, 2-isopropylthioxanthone, thioxanthone, diethyl thioxanthone, 1,5-acetonaphthylene, ethyl-p-dimethylaminobenzoate, benzil ketone, α-hydroxy keto, 2,4,6-trimethylbenzoyldiphenyl phosphine oxide, benzyl dimethyl ketal, 2,2-dimethoxy-1,2-diphenylethanone, 1-hydroxycylclohexyl phenyl ketone, 2-methyl-1-[4-(methylthio) phenyl]-2-morpholinopropanone-1, 2-hydroxy-2-methyl-1-phenyl-propanone, oligomeric α-hydroxy ketone, benzoyl phosphine oxides, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino) benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino) benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl)phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene)cyclopentadienyl iron (ii) hexafluorophosphate, 9,10-diethoxy and 9,10-dibutoxyanthracene, 2-ethyl-9,10-dimethoxyanthracene, thioxanthen-9-one and combinations thereof.

Component e)

The curable composition may optionally comprise, as component e), one or more compounds or substances which improve adhesion, but are not (meth)acrylate functionalized (i.e., contain no (meth)acrylate functionality). These additives may improve the adhesion of the cured elastic material obtained from the curable composition to the substrate on which the curable composition was originally applied. Additives that enhance substrate adhesion but do not contain reactive (meth)acrylate functional groups include tackifying resins, polymers that have intrinsic adhesive properties, or components that do not have intrinsic adhesive properties but enhance substrate adhesion when included as a component of the curable composition. An adhesion-enhancing component that does not contain (meth)acrylate functionality may be used at 0-30% (w/w) loading, for example.

In particular, the adhesion-enhancing component may be a silane.

Other Optional Components

The curable composition may optionally comprise one or more aerobic inhibitors, anaerobic inhibitors, and/or antioxidants. These additives are usually employed to inhibit unwanted premature polymerization during production of the composition, during storage of the composition at elevated temperature or over extended periods of time, during coating, during other times where the composition is exposed to temperatures above room temperature, or any times when the product is exposed to incidental radiation (such as sunlight) prior to curing. A curable composition may contain 0-5% by weight, based on the total weight of the curable composition, of each kind of inhibitor, for example.

The curable composition may optionally comprise one or more non-(meth)acrylate component(s) for the purpose(s) of improving performance, managing cost, improving processability, or to otherwise modify the properties and attributes of the curable composition and the elastic material prepared therefrom. Exemplary additives and fillers may include, but are not limited to, linear low density polyethylene, ultra low density polyethylene, low density polyethylene, high density polyethylene, any other polyethylene, polypropylene, polyvinyl acetate, ethyl vinyl acetate, polyvinyl butyrate, thermoplastic urethanes, EVA grafted terpolymer, clay, zeolite, mineral powders, block copolymers, other impact modifiers, engineered polymers such as core-shell particles, organic nanoparticles, and/or inorganic nanoparticles. A curable composition employed in the present invention may, for example, contain 0% to 30% by weight, based on the total weight of the curable composition, of one or more of these additives or fillers.

Pigments may be included as part of the curable composition. A pigment can be any chemical which provides visible color to the finished elastic material. These chemicals include conjugated organic molecules, inorganics, or organometallic compounds. Dyes can also have photochromic, electrochromic, or mechanochromic properties, and can exhibit photoswitching or other responsive visual effects.

Exemplary embodiments of the present invention include elastic materials which are the polymerization reaction products of the following curable compositions:

A curable composition comprising components a), b), c) and d):

- component a): 65 to 75% by weight, based on the total weight of components a), b), c), and d) of acrylate-functionalized polyurethane oligomer based on polypropylene glycol and having an average acrylate functionality of 1 to 2 and a number average molecular weight of 15,000 to 25,000 Daltons as measured by gel permeation chromatography using polystyrene standards;
- component b): 18 to 30% by weight, based on the total weight of components a), b), c), and d), of at least one mono(meth)acrylate-functionalized monomer selected from the group consisting of isobornyl acrylate, 2(2-ethoxy ethoxy) ethyl acrylate, and tetrahydrofurfuryl acrylate;
- component c): 2 to 6% by weight, based on the total weight of components a), b), c), and d), of 1,6-hexanediol diacrylate; and component d): 0.3 to 5% by weight, based on the total weight of components a), b), c), and d), of at least one photoinitiator.

A curable composition comprising components a), b), c) and d):

- component a): 70 to 75% by weight, based on the total weight of components a), b), c), and d), of a mixture of i) acrylate-functionalized polyurethane oligomer based on polypropylene glycol and having an average acrylate functionality of 1 to 2 and a number average molecular weight of 15,000 to 25,000 Daltons as measured by gel permeation chromatography using polystyrene standards and ii) (meth)acrylate-functionalized polyurethane oligomer based on polypropylene glycol which comprises both acrylate and methacrylate functional groups and which has an average (meth)acrylate functionality of 1 to 2 and a number average molecular weight of 8,000 to 15,000 Daltons as measured by gel permeation chromatography using polystyrene standards, wherein i) and ii) are present in a weight ratio of 1:0.8 to 1:2.5;
- component b): 18 to 25% by weight, based on the total weight of components a), b), c), and d), of at least one mono(meth)acrylate-functionalized monomer selected from the group consisting of isobornyl acrylate, 2(2-ethoxy ethoxy) ethyl acrylate, and tetrahydrofurfuryl acrylate;
- component c): 3 to 7% by weight, based on the total weight of components a), b), c), and d), of 1,6-hexanediol diacrylate; and component d): 0.3 to 5% by weight, based on the total weight of components a), b), c), and d), of at least one photoinitiator.

According to various embodiments of the invention, the curable composition may be characterized as comprising less than 10%, less than 5%, less than 1%, less than 0.5%, less than 0.1%, or less than 0.01% by weight or even 0% by weight, based on the total weight of the curable composition, of one or more of the following ingredients:

An elongation promoter which is a sulfur-containing compound, in particular a sulfur-containing compound having a molecular weight of less than 1,000 Daltons, as described in U.S. Pat. Nos. 6,265,476 and 7,198,576;

An oligomer or monomer, exclusive of (meth)acrylate functional groups, having an ethylenically unsaturated functional group (i.e., a functional group which contains ethylenic unsaturation which is other than a (meth)acrylate functional group, such as a vinyl group), as described in U.S. Pat. Nos. 6,265,476 and 7,198,576;

A polythiol compound having 2 to 6 mercapto groups per molecule, as described in US Pat. Pub No. 2012/0157564 A1;

A polysiloxane selected from acryloxyalkyl and methacryloxyalkyl-terminated polydialkylsiloxanes, i.e., a (meth)acrylated polysiloxane as described in U.S. Pat. No. 5,268,396;

A rubber (elastomer) that does not contain (meth)acrylate functional groups; A rubber containing (meth)acrylate functional groups that has elastomeric properties in its uncured state; and/or Silica.

Each of the above-stated patent documents is hereby incorporated by reference in its entirety for all purposes.

Preparation of the Curable Composition

Typically, it will be desirable for the various components of the curable composition to be combined and mixed together until homogenous. The production process can be tailored based on the identities and amounts of different ingredients used in the curable composition, processability considerations, or anything else deemed important to production. For example, the ingredients can be added in any order, individually or as premixed blends with other ingredient(s) in the curable composition, slowly or quickly, and at any temperature. To combine and homogenize the components of the curable composition, elevated temperatures and/or agitation may be required. Typically, the processing temperature is advantageously maintained below temperatures that would cause premature polymerization of components of the curable composition.

Applying/Using the Curable Composition

According to aspects of the invention, the curable composition may be applied to a substrate, in particular to one or more surfaces of a substrate. Any means of coating, depositing, or applying liquid curable compositions known in the art may be used here. These methods include, but are not limited to, coating, rolling, extruding, injecting, spraying, and others. In some cases, the curable composition is heated above room temperature before being applied to the substrate. In other cases, the curable composition is applied at ambient temperature (e.g., room temperature or about 15° C. to about 30° C.). The substrate may optionally be pretreated to improve its adhesion to the elastic material obtained by polymerizing the curable composition. The curable composition may be applied with the intention of permanently bonding the elastic material obtained therefrom with the substrate. Alternatively, the substrate may be a nonstick material (e.g., a release liner film) such that the substrate can be easily removed or separated from the elastic material after curing. The curable composition may be applied or deposited onto a previously cured layer of a curable composition in accordance with the present invention. An article comprised of elastic material in accordance with the present invention may be formed by any suitable method such as casting or 3D printing.

Curing of the Curable Composition

In accordance with aspects of the present invention, the above-described composition may be polymerized into a solid, dimensionally stable material with elastomeric properties. The components of the curable composition may be selected such that the curable composition is capable of polymerizing upon exposure to UV or visible radiation from any light source or by EB. In one embodiment, a layer of the curable composition is passed under an energy source on a conveyor line, web, etc. The curing may happen in a manufacturing setting or may occur at remote locations, for example in the field, home, or as part of a "do it yourself" application. The curing of a layer of the curable composition may happen while that layer is in contact with a previously cured layer. The curing may occur as part of a 3D printing process.

The method for making the elastic material according to the invention comprises curing the curable composition of the invention. In particular, the curable composition may be cured by exposing the composition to radiation. More particularly, the curable composition may be cured by exposing the composition to an electron beam (EB), a light source (for example a visible light source, a near-UV light source, an ultraviolet lamp (UV), a light-emitting diode (LED) or an infrared light source) and/or heat.

Curing may be accelerated or facilitated by supplying energy to the curable composition, such as by heating the curable composition. Thus, the elastic material may be deemed as the reaction product of the curable composition, formed by curing. A curable composition may be partially cured by exposure to actinic radiation, with further curing being achieved by heating the partially cured elastic material. For example, a product formed from the curable composition may be heated at a temperature of from 40° C. to 120° C. for a period of time of from 5 minutes to 12 hours.

Prior to curing, the curable composition may be applied to a substrate surface in any known conventional manner, for example, by spraying, jetting, knife coating, roller coating, casting, drum coating, dipping, and the like and combinations thereof. Indirect application using a transfer process may also be used.

The substrate on which the curable composition is applied and cured may be any kind of substrate. Curable compositions in accordance with the present invention may also be formed or cured in a bulk manner (e.g., the curable composition may be cast into a suitable mold and then cured).

The elastic material obtained with the process of the invention may be a coating, an adhesive, a sealant, a molded article, or a 3D-printed article, in particular a coating or a 3D-printed article.

A 3D-printed article may, in particular, be obtained with a process for the preparation of a 3D-printed article that comprises printing a 3D article with the curable composition of the invention. In particular, the process may comprise printing a 3D article layer by layer or continuously.

A plurality of layers of a curable composition in accordance with the present invention may be applied to a substrate surface; the plurality of layers may be simultaneously cured (by exposure to a single dose of radiation, for example) or each layer may be successively cured before application of an additional layer of the curable composition.

The curable compositions which are described herein can be used as resins in three-dimensional printing applications. Three-dimensional (3D) printing (also referred to as additive manufacturing) is a process in which a 3D digital model is manufactured by the accretion of construction material. The 3D printed object is created by utilizing the computer-aided design (CAD) data of an object through sequential construction of two dimensional (2D) layers or slices that correspond to cross-sections of 3D objects. Stereolithography (SL) is one type of additive manufacturing where a liquid resin is hardened by selective exposure to a radiation to form each 2D layer. The radiation can be in the form of electromagnetic waves or an electron beam. The most commonly applied energy source is ultraviolet, near-UV, visible or infrared radiation.

Stereolithography and other photocurable 3D printing methods typically apply low intensity light sources to radiate each layer of a photocurable resin to form the desired article. As a result, photocurable resin polymerization kinetics and the green strength of the printed article are important criteria if a particular photocurable resin will sufficiently polymerize (cure) when irradiated and have sufficient green strength to retain its integrity through the 3D printing process and post-processing.

The curable compositions of the invention may be used as 3D printing resin formulations, that is, compositions intended for use in manufacturing three-dimensional articles using 3D printing techniques. Such three-dimensional articles may be free-standing/self-supporting and may consist essentially of or consist of a composition in accordance with the present invention that has been cured. The three-dimensional article may also be a composite, comprising at least one component consisting essentially of or consisting of a cured composition as previously mentioned as well as at least one additional component comprised of one or more materials other than such a cured composition (for example, a metal component or a thermoplastic component or inorganic filler or fibrous reinforcement). The curable compositions of the present invention are particularly useful in digital light printing (DLP), although other types of three-dimensional (3D) printing methods may also be practiced using the inventive curable compositions (e.g., SLA, inkjet, multi-jet printing, piezoelectric printing, actinically-cured extrusion, and gel deposition printing). The curable compositions of the present invention may be used in a three-dimensional printing operation together with another material which functions as a scaffold or support for the article formed from the curable composition of the present invention.

Thus, the curable compositions of the present invention are useful in the practice of various types of three-dimensional fabrication or printing techniques, including methods in which construction of a three-dimensional object is performed in a step-wise or layer-by-layer manner. In such methods, layer formation may be performed by solidification (curing) of the curable composition under the action of exposure to radiation, such as visible, UV or other actinic irradiation. For example, new layers may be formed at the top surface of the growing object or at the bottom surface of the growing object. The curable compositions of the present invention may also be advantageously employed in methods for the production of three-dimensional objects by additive manufacturing wherein the method is carried out continuously. For example, the object may be produced from a liquid interface. Suitable methods of this type are sometimes referred to in the art as "continuous liquid interface (or interphase) product (or printing)" ("CLIP") methods. Such methods are described, for example, in WO 2014/126830; WO 2014/126834; WO 2014/126837; and Tumbleston et al., "Continuous Liquid Interface Production of 3D Objects," Science Vol. 347, Issue 6228, pp. 1349-1352 (Mar. 20, 2015.

The curable composition may be supplied by ejecting it from a printhead rather than supplying it from a vat. This type of process is commonly referred to as inkjet or multijet 3D printing. One or more UV curing sources mounted just behind the inkjet printhead cures the curable composition immediately after it is applied to the build surface substrate or to previously applied layers. Two or more printheads can be used in the process which allows application of different compositions to different areas of each layer. For example, compositions of different colors or different physical properties can be simultaneously applied to create 3D printed parts of varying composition. In a common usage, support materials—which are later removed during post-processing—are deposited at the same time as the compositions used to create the desired 3D printed part. The printheads can operate at temperatures from about 25° C. up to about 100° C. Viscosities of the curable compositions are less than 30 mPa·s at the operating temperature of the printhead.

The process for the preparation of a 3D-printed article may comprise the steps of:

a) providing (e.g., coating) a first layer of a curable composition in accordance with the present invention onto a surface;
b) curing the first layer, at least partially, to provide a cured first layer;
c) providing (e.g., coating) a second layer of the curable composition onto the cured first layer;
d) curing the second layer, at least partially, to provide a cured second layer adhered to the cured first layer; and
e) repeating steps c) and d) a desired number of times to build up the three-dimensional article.

After the 3D article has been printed, it may be subjected to one or more post-processing steps. The post-processing steps can be selected from one or more of the following steps removal of any printed support structures, washing with water and/or organic solvents to remove residual resins, and post-curing using thermal treatment and/or actinic radiation either simultaneously or sequentially. The post-processing steps may be used to transform the freshly printed article into a finished, functional article ready to be used in its intended application.

Articles Comprising the Elastic Material

The elastic material of the present invention may be permanently attached to a substrate. Alternatively, the elastic material may provide a free-standing article if removed from the substrate after curing. The elastic material may be in the form of a very thin article (e.g., <1 mil thickness), a thick article (e.g., >1" thick), or of an article of intermediate thickness. The article comprising the elastic material might be a layered item, produced by alternatively curing a layer of the curable composition and reapplying and curing one or more additional layers of curable composition. Such multi-layered articles encompass articles with a small number of layers (e.g., 2 or 3 layers) as well as those with many layers (e.g., >3 layers, such as in certain types of 3D printing).

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable compositions, materials, products and articles prepared therefrom and methods for making and using such curable compositions described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

Example 1 examined the relationships between the make-up of a curable (e.g., energy-curable) composition (the identities of the components in the composition and the relative loadings of those component loadings) and the properties of the cured material obtained therefrom. Accordingly, different curable compositions were qualitatively compared. On the composition side, the variables were different oligomer identities and different loadings of a crosslinking monomer. One objective of these studies was to understand the effects of these variables on the resiliency and hardness of the cured products prepared from the curable compositions.

The different energy-curable compositions are described in Table 1. Each composition was based on a formulation containing 75% by weight oligomer, 20% by weight isobornyl acrylate, and 5% by weight Irgacure® 2022 photoinitiator, with varying amounts (0-4% by weight) of 1,6-hexanediol diacrylate ("HDDA") being added to the base formulation. Oligomers were chosen which had a variety of number average molecular weights and functionalities. Table 1 only shows chemical properties of the different oligomers used because the other chemical components were the same for all samples. The energy-curable compositions were prepared in about 50 g quantities and blended at room temperature using a FlackTek® high-speed mixer. Once homogenous, each energy-curable composition was separately poured into an open-faced aluminum mold and cured by passing the filled mold twice under a 600 W Fusion D bulb at 10 ft/min. This energy dose was in excess of the dose required to cure the samples, but was used in order to have complete confidence in the completeness of cure. Once reacted, the samples were aged (i.e., postcured) for 1 day at ambient conditions before testing. The hardness was tested qualitatively by hand, where a material easily deformed was deemed "too soft" and samples that would not compress/bend deemed "too hard". Samples with intermediate hardness were considered qualitatively in-line with materials typically classified as elastomers. Resiliency was tested quantitatively with a Bayshore Resiliency tester, but the results were recorded qualitatively. Samples with <10% rebound were deemed as having "poor" resiliency while samples with >10% rebound were considered to have "good" resiliency. Elongation was not measured in this study.

TABLE 1

| Sample Nos. | Oligomer | 0% HDDA (w/w) | 1% HDDA (w/w) | 2% HDDA (w/w) | 4% HDDA (w/w) |
|---|---|---|---|---|---|
| 1-3 | A | – | – | – | n/a |
| 4-6 | B | ○ | n/a | ○ | + |
| 7-9 | C | ○ | n/a | + | – |
| 10, 11 | D | n/a | n/a | + | – |
| 12, 13 | E | n/a | n/a | + | – |
| 14 | F | n/a | n/a | – | n/a |

○ = very soft + poor rebound
+ = medium hardness + good rebound
– = very hard + poor rebound Description of Formulation Components:

Oligomer A: Diadduct of hydrogenated methylene diisocyanate and caprolactone acrylate, approximate average functionality=2, approximate $M_n$=1,000.

Oligomer B: Urethane acrylate with a polypropylene glycol backbone, approximate average functionality=1.8, approximate $M_n$=20,000 Daltons.

Oligomer C: Urethane acrylate with a neopentyl glycol/adipic acid backbone, approximate average functionality=1.5, approximate $M_n$=10,000 Daltons.

Oligomer D: Urethane acrylate with a hydrogenated polyolefin backbone, approximate average functionality=2, approximate $M_n$=7,000 Daltons.

Oligomer E: Urethane acrylate with a hydrogenated polyolefin backbone, approximate average functionality=2, approximate $M_n$=4,000 Daltons.

Oligomer F: Urethane acrylate with a polytetramethylene ether glycol backbone, approximate average functionality=2, approximate $M_n$=2,000 Daltons.

One of the main conclusions from this study was the association between crosslink density and resiliency. All else equal, low crosslinking density made the cured samples soft and unable or slow to return to their original shape after deformation. On the other hand, excessive crosslinking made samples unable to flex. The comparison of samples 7, 8, and 9 particularly demonstrates this trend. Additionally, the data show that the amount of crosslinker needed to achieve the medium hardness and good resiliency depended on the molecular weight and functionality of the oligomer. A third finding was that, of the samples categorized as “medium hardness and good rebound”, the sample prepared using the highest molecular weight, lowest functionality oligomer provided the highest rebound.

Example 2

This study consisted of 15 samples, all containing different loadings of the same resin components: a high molecular weight ($M_n$ approximately 20,000 Daltons), low functionality urethane acrylate oligomer based on polypropylene glycol (the same oligomer as Oligomer B in Example 1), isobornyl acrylate (“IBA”), 2(2-ethoxyethoxy) ethyl acrylate (“EEEA”), and 1,6-hexanediol diacrylate (“HDDA”). The photoinitiator was Irgacure® 2022 and was used at 1% by weight in each of the energy-curable compositions. The formulations for each sample are shown in Table 2a.

For each sample, the energy-curable composition was prepared by combining the components together at room temperature at a scale of 60 g, then mixing using a FlackTek high-speed mixer. The energy-curable composition was cured between two glass panels at a thickness of 1.6 mm using a 600 W Fusion D bulb at a line speed of 10 ft/min. This energy dose was in excess of the dose required to cure the samples, but was used in order to have complete confidence in the completeness of cure. Once reacted, the samples were aged (i.e., post-cured) for 1 day at ambient conditions before testing. The test results are shown in Table 2b.

Each cured sample was evaluated in several ways. For each sample, the elongation was measured by stamping three dogbone-shaped tensile bars and testing the bars in accordance with ASTM D638-02a (issued in 2002), wherein the sample geometry was in conformance with a Type IV geometry. The distance between the grips (AKA ‘crossheads’) was 6.35 cm. The initial sample length used for the calculation of elongation at break was the length of the narrow part of the specimen (3.3 cm). The strain rate was 2.54 cm/min. The elongations displayed in Table 2b are the averages of the three replicates. Resiliency was tested using an adaption of ASTM D2632-01 (reapproved 2008), where five 1×1" squares of the 1.6 mm film were cut, stacked, and tested three times on the Bayshore Resiliency instrument. Because some of the samples had slight surface tack that could interfere with the plunger’s rebound height, the samples were covered with a thin piece of plastic film during testing. The resiliency displayed in Table 2b is the average of three measurements. Hardness was measured using a Shore A durometer. Unlike elongation and resiliency, only one hardness measurement was taken per sample. In addition to this quantitative testing, the elastic elongation and elastic recovery were evaluated qualitatively by hand.

These experiments demonstrate that high elongation and resiliency can be simultaneously achieved in an energy-cured material. While not displayed in Table 2b, most of these samples also had good elastic elongation and fast elastic recovery, which are characteristic of elastomers. Specifically, in most cases the elastic elongation was qualitatively identical to the elongation at break.

TABLE 2a

Formulation of Uncured Compositions

| Sample No. | Olig. B (w/w %) | IBA (w/w %) | EEEA (w/w %) | HDDA (w/w %) | Photo-initiator (w/w %) |
|---|---|---|---|---|---|
| 15 | 68.0 | 10.1 | 18.3 | 2.6 | 1.0 |
| 16 | 56.9 | 18.9 | 15.6 | 7.6 | 1.0 |
| 17 (comp) | 37.0 | 28.0 | 29.2 | 4.8 | 1.0 |
| 18 | 52.4 | 22.9 | 19.7 | 4.0 | 1.0 |
| 19 | 51.0 | 10.6 | 29.7 | 7.8 | 1.0 |
| 20 (comp) | 41.4 | 23.8 | 26.4 | 7.4 | 1.0 |
| 21 | 64.3 | 16.5 | 13.8 | 4.3 | 1.0 |
| 22 | 59.9 | 12.2 | 20.5 | 6.5 | 1.0 |
| 23 | 72.8 | 11.3 | 9.9 | 5.0 | 1.0 |
| 24 | 60.7 | 25.0 | 11.0 | 2.3 | 1.0 |
| 25 | 44.5 | 29.6 | 21.7 | 3.2 | 1.0 |
| 26 | 48.8 | 26.7 | 17.5 | 5.9 | 1.0 |
| 27 | 56.1 | 15.0 | 25.0 | 2.9 | 1.0 |
| 28 | 48.1 | 20.5 | 28.4 | 2.0 | 1.0 |
| 29 | 53.1 | 28.9 | 10.1 | 6.9 | 1.0 |

TABLE 2b

Cured Material Properties

| Sample No. | Elongation (%) | Resiliency (%) | Hardness (Shore A) |
|---|---|---|---|
| 15 | 349 | 42 | 28 |
| 16 | 236 | 21 | 42 |
| 17 (comp) | 103 | 23 | 38 |
| 18 | 219 | 22 | 35 |
| 19 | 164 | 46 | 45 |

TABLE 2b-continued

| Cured Material Properties | | | |
|---|---|---|---|
| Sample No. | Elongation (%) | Resiliency (%) | Hardness (Shore A) |
| 20 (comp) | 95 | 20 | 45 |
| 21 | 260 | 29 | 29 |
| 22 | 260 | 41 | 32 |
| 23 | 471 | 41 | 26 |
| 24 | 394 | 21 | 21 |
| 25 | 207 | 19 | 44 |
| 26 | 170 | 14 | 38 |
| 27 | 249 | 32 | 30 |
| 28 | 281 | 26 | 21 |
| 29 | 227 | 26 | 54 |

Example 3

Table 3a below includes compositional information and Table 3b includes cured elastomeric property data for ten additional energy-cured elastomers (and two samples from Example 2 for comparison). A wider variety of oligomers and monomers were used here than in the previous example. Notably, one of the oligomers in Example 3 is a PPG-based urethane (meth)acrylate that contains both acrylate and methacrylate functional groups. Each of the formulations contained 1 (w/w) Irgacure® 2022 photoinitiator except for Sample 39 which contains 5% Irgacure® 1173 as the photoinitiator. The procedures for preparing, curing, and testing the compositions were identical to those of the previous example. The one exception is that, in Example 3, the hardnesses were measured in triplicate, with the average hardness shown in Table 3b.

TABLE 3a

| Formulation of Uncured Compositions (amounts are in % by weight based on the weight of the composition) | | | | | | | | | |
|---|---|---|---|---|---|---|---|---|---|
| Sample No. | Olig. G | Olig. B | Olig. H | IBA | EEEA | Monomer Mix | THFA | HDDA | TCDDMDA |
| 30 | 33.00 | 33.00 | — | — | 28.29 | — | — | 4.71 | — |
| 15 | — | 67.96 | — | 10.12 | 18.29 | — | — | 2.63 | — |
| 23 | — | 72.83 | — | 11.29 | 9.91 | — | — | 4.98 | — |
| 31 | — | 72.83 | — | 11.29 | 9.91 | — | — | — | 4.98 |
| 32 | — | 67.96 | — | 28.41 | — | — | — | 2.63 | — |
| 33 | — | 69.10 | — | 10.99 | 10.99 | — | — | 7.92 | — |
| 34 | — | 69.10 | — | 10.99 | — | 10.99 | — | 7.92 | — |
| 35 | — | 36.41 | 36.41 | 11.29 | 9.91 | — | — | 4.98 | — |
| 36 | — | 36.41 | 36.41 | 21.20 | — | — | — | 4.98 | — |
| 37 | — | 24.28 | 48.55 | 11.29 | 9.91 | — | — | 4.98 | — |
| 38 | — | 24.28 | 48.55 | 11.29 | — | 9.91 | — | 4.98 | — |
| 39 | — | 23.29 | 46.59 | 10.83 | — | — | 9.51 | 4.78 | — |

Description of Formulation Components:

"Olig. G"—Urethane acrylate oligomer having a number average molecular weight of about 5,000 Daltons, wherein the backbone of the oligomer contains polyester based on neopentyl glycol and adipic acid.

"Olig. B"—Same as Oligomer B in Example 1.

"Olig. H"—Urethane (meth)acrylate oligomer having a number average molecular weight of about 11,000 Daltons, wherein the backbone of the oligomer contains polypropylene glycol and the molar ratio of acrylate:methacrylate functional groups on average in the oligomer is about 1:1, wherein about half of the oligomer molecules bear both an acrylate functional group and a methacrylate functional group; average (meth)acrylate functionality=2.

"IBA"—isobornyl acrylate.

"EEEA"—2(2-ethoxyethoxy) ethyl acrylate.

"Monomer Mix."—1:1 (w/w) mixture of isooctyl acrylate and isodecyl acrylate.

"THFA"—tetrahydrofurfuryl acrylate.

"HDDA"—1,6-hexanediol diacrylate.

"TCDDMDA"—tricyclodecane dimethanol diacrylate.

TABLE 3b

| Cured Material Properties | | | |
|---|---|---|---|
| Sample No. | Elongation (%) | Resiliency (%) | Hardness (Shore A) |
| 30 | 182 | 27 | 56 |
| 15 | 325 | 42 | 28 |
| 23 | 364 | 41 | 26 |
| 31 | 454 | 29 | 26 |
| 32 | 562 | 24 | 46 |
| 33 | 292 | 26 | 40 |
| 34 | 296 | 27 | 40 |
| 35 | 326 | 35 | 43 |
| 36 | 324 | 26 | 55 |
| 37 | >318 | 37 | 50 |
| 38 | 229 | 37 | 44 |
| 39 | 292 | 35 | 45 |

One conclusion that may be made from this study is that energy-curable compositions comprising higher molecular weight, lower functionality oligomer(s) tend to make higher elongation, higher resiliency, and softer materials when cured. As a separate conclusion, Example 3 also demonstrates possible strategies for controlling material hardness while maintaining elasticity. Samples 15 and 32 showed that changing the ratio of the two monofunctional monomers changed the material hardness, yet in both cases the material was clearly elastomeric. By comparing Samples 23, 35, and 37, another strategy for controlling hardness may be identified: adjusting the ratio of two high molecular weight, low functionality oligomers. As the ratio of the harder (higher Tg) oligomer is increased, the hardness increases. All three materials, however, remain very elastic.

Example 4

Table 4a below includes compositional information and Table 4b includes cured elastomeric property data for additional energy-cured elastomers. The main purpose of Example 4 was to demonstrate curable compositions comprising ethylenically unsaturated nitrogen-containing monomer and the properties of the cured elastomers prepared from these compositions. Some of the samples include both ethylenically unsaturated nitrogen-containing monomer and monofunctional (meth)acrylate monomer. Others include ethylenically unsaturated nitrogen-containing monomer but no monofunctional (meth)acrylate monomer.

TABLE 4a

| Formulation of Uncured Compositions (amounts are in % by weight based on the weight of the composition) | | | | | | | | | | |
|---|---|---|---|---|---|---|---|---|---|---|
| Sample No. | Olig. B | Olig. H | IBA | THFA | DMAA | VCAP | VMOX | HDDA | PI 1173 | PI 819 |
| 39 | 23.29 | 46.59 | 10.83 | 9.51 | | | | 4.78 | 5.00 | |
| 40 | 23.29 | 46.59 | 10.83 | | 9.51 | | | 4.78 | 5.00 | |
| 41 | 23.29 | 46.59 | | 9.51 | 10.83 | | | 4.78 | 5.00 | |
| 42 | 23.29 | 46.59 | | | 20.34 | | | 4.78 | 5.00 | |
| 43 | 23.29 | 46.59 | 10.83 | | | 9.51 | | 4.78 | 5.00 | |
| 44 | 23.29 | 46.59 | | 9.51 | | 10.83 | | 4.78 | 5.00 | |
| 45 | 23.29 | 46.59 | | | | 20.34 | | 4.78 | 5.00 | |
| 46 | 23.29 | 46.59 | 10.83 | | | | 9.51 | 4.78 | 5.00 | |
| 47 | 23.29 | 46.59 | | 9.51 | | | 10.83 | 4.78 | 5.00 | |
| 48 | 23.29 | 46.59 | | | | | 20.34 | 4.78 | 5.00 | |
| 49 | 23.29 | 46.59 | 10.83 | 9.51 | | | | 4.78 | | 5.00 |
| 50 | 23.29 | 46.59 | 10.83 | | 9.51 | | | 4.78 | | 5.00 |
| 51 | 23.29 | 46.59 | | 9.51 | 10.83 | | | 4.78 | | 5.00 |
| 52 | 23.29 | 46.59 | | | 20.34 | | | 4.78 | | 5.00 |
| 53 | 23.29 | 46.59 | 10.83 | | | 9.51 | | 4.78 | | 5.00 |
| 54 | 23.29 | 46.59 | | 9.51 | | 10.83 | | 4.78 | | 5.00 |
| 55 | 23.29 | 46.59 | | | | 20.34 | | 4.78 | | 5.00 |
| 56 | 23.29 | 46.59 | 10.83 | | | | 9.51 | 4.78 | | 5.00 |
| 57 | 23.29 | 46.59 | | 9.51 | | | 10.83 | 4.78 | | 5.00 |
| 58 | 23.29 | 46.59 | | | | | 20.34 | 4.78 | | 5.00 |

Description of Formulation Components:

"DMAA"—N,N-dimethylacrylamide

"VCAP"—N-vinylcaprolactam

"VMOX"—vinyl methyl oxazolidinone

"PI 1173"—Irgacure® 1173

"PI 819"—Irgacure® 819

A secondary purpose of the study was to demonstrate the effects of photoinitiator selection on the cured properties. In particular, two photoinitiators were included in Example 4. In order to compare the two photoinitiators, Samples 49-58 were designed to be identical in composition to Samples 39-48, with the exception of the photoinitiator. Sample 39 (see Example 3) was prepared, cured, and tested again for Example 4 in order to serve as a comparison to Samples 40-48. In a similar way, Sample 49 which is free of ethylenically unsaturated nitrogen-containing monomer served as a comparison for Samples 50-58.

Unlike the previous examples, Example 4 included T-peel testing to evaluate the adhesion between the cured composition and the substrate on which the curable composition was coated prior to curing. Specifically, the liquid composition was applied between two layers of PET film and then energy cured. The cured film was then cut into 1 in. wide strips prior to testing. The T-peel tests used an Instron tensile tester to peel apart the two layers of PET at a rate of 1 in/min. The reported value is in lb/in, where a higher value corresponds to better adhesion. The latter half of Example 4 (Samples 50-58) was focused on optimizing the substrate adhesion. For this reason, Samples 50-58 did not undergo quantitative resiliency and hardness testing, but instead these samples were evaluated qualitatively. According to this qualitative testing, all cured specimens of Samples 40-58 had resiliency and hardnesses characteristic of an elastomer.

One conclusion that can be drawn from Example 4 is that the curable compositions comprising ethylenically unsaturated nitrogen-containing monomer produce cured elastomer. This conclusion is valid whether or not the composition also comprises monofunctional (meth)acrylate monomers. A second conclusion is that N,N-dimethyl acrylamide, when included in the curable composition, enables higher T-peel strengths.

TABLE 4b

| Cured Material Properties | | | | |
|---|---|---|---|---|
| Sample No. | Elongation (%) | Resiliency (%) | Hardness (Shore A) | T-Peel (lb/in) |
| 39 | 279% | 33 | 46 | 0.790 |
| 40 | 252% | 25 | 48 | 1.126 |
| 41 | 305% | 29 | 52 | 0.822 |
| 42 | 275% | 30 | 58 | 1.088 |
| 43 | 221% | 31 | 58 | 0.708 |
| 44 | 269% | 23 | 55 | 0.972 |
| 45 | 218% | 28 | 60 | 0.366 |
| 46 | 287% | 34 | 53 | 0.332 |
| 47 | 282% | 32 | 62 | 0.422 |
| 48 | 302% | 38 | 65 | 0.456 |
| 49 | 304% | | | 0.243 |
| 50 | 295% | | | 0.569 |
| 51 | 295% | | | 0.869 |
| 52 | 335% | | | 2.165 |
| 53 | 247% | | | 0.333 |
| 54 | 246% | | | 0.334 |
| 55 | 258% | | | 0.493 |
| 56 | 289% | | | 0.304 |
| 57 | 278% | | | 0.339 |
| 58 | 235% | | | 0.380 |

The invention claimed is:

1. An elastic material, wherein the elastic material has an elongation greater than 150% as measured according to ASTM D638-02a, a resiliency greater than 12% as measured according to ASTM D2632-01 (reapproved 2008), and a Shore A hardness of at least 10 as measured by ASTM D2240-15e1, and wherein the elastic material is an energy-cured reaction product of a curable composition which is a liquid at 25° C. and which is comprised of components a), b) and c):

a) 43 to 89.9% by weight, based on the total weight of components a), b) and c), of (meth)acrylate-functionalized oligomer having no more than two (meth)acrylate functional groups per molecule on average, wherein the number average molecular weight of component a) as a whole as measured using gel permeation chromatography and polystyrene standards is at least 10,000 Daltons;

b) 10 to 55% by weight, based on the total weight of components a), b) and c), of:

i) at least one high Tg monoacrylate-functionalized monomer and at least one low Tg monoacrylate-functionalized monomer or ii) at least one monomer of formula

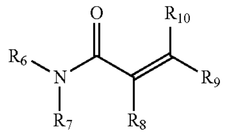

wherein:

$R_6$ and $R_7$ are independently selected from H, alkyl, aryl, $-L_3-C(=O)-R_{12}$, cycloalkyl, aminoalkyl and alkoxyalkyl; or $R_6$ and $R_7$ may form, with the nitrogen atom to which they are attached, a 4 to 10-membered ring;

$R_8$, $R_9$ and $R_{10}$ are independently selected from H, alkyl and Cl;

$R_{12}$ is H or alkyl; and $L_3$ is alkylene; and c) 0.1 to 10% by weight, based on the total weight of components a), b) and c), of at least one multi(meth) acrylate-functionalized monomer having a molecular weight of less than 1000 Daltons and at least two (meth)acrylate functional groups per molecule.

2. The elastic material of claim 1, wherein the elastic material has a probe tack of not greater than 4.4 N as measured according to ASTM D2979-95 using a ChemInstruments® PT-500 Inverted Probe Machine in the tension-peak mode.

3. The elastic material of claim 1, wherein the elastic material has an elongation greater than 200% as measured according to ASTM D638-02a.

4. The elastic material of claim 1, wherein the elastic material has a resiliency greater than 20% as measured according to ASTM D2632-01 (reapproved 2008).

5. The elastic material of claim 1, wherein the elastic material has a Shore A hardness of at least 15 as measured by ASTM D2240-15e1.

6. The elastic material of claim 1, wherein the curable composition has a viscosity at 25° C. of not more than 50,000 centipoise as measured using a rotational Brookfield viscometer.

7. The elastic material of claim 1, wherein the curable composition is additionally comprised of component d) wherein component d) is an initiator system.

8. The elastic material of claim 1, wherein component a) comprises at least one (meth)acrylate-functionalized oligomer selected from the group consisting of epoxy (meth) acrylate oligomers, urethane (meth)acrylate oligomers, polyester (meth)acrylate oligomers, (meth)acrylic (meth) acrylate oligomers, and amino (meth)acrylate oligomers.

9. The elastic material of claim 1, wherein component a) comprises a (meth)acrylate-functionalized oligomer having a glass transition temperature of less than −20° C. as measured by differential scanning calorimetry.

10. The elastic material of claim 1, wherein component a) comprises a (meth)acrylate-functionalized polyurethane oligomer based on polypropylene glycol.

11. The elastic material of claim 10, wherein the polypropylene glycol has a number average molecular weight of at least 2,000 Daltons.

12. The elastic material of claim 1, wherein the number average molecular weight of component a) as a whole as measured using gel permeation chromatography and polystyrene standards is from 12,000 to 50,000 Daltons.

13. The elastic material of claim 1, wherein component c) comprises one or more di(meth)acrylate-functionalized monomers.

14. The elastic material of claim 1, wherein component c) comprises at least one compound selected from the group consisting of ethoxylated bisphenol A di(meth)acrylates, triethylene glycol di(meth)acrylates, ethylene glycol di(meth)acrylates, tetraethylene glycol di(meth)acrylates, polyethylene glycol di(meth)acrylates, 1,4-butanediol di(meth) acrylates, diethylene glycol di(meth)acrylates, 1,6-hexanediol di(meth)acrylates, neopentyl glycol di(meth) acrylates, 1,12-dodecanediol di(meth)acrylates, 1,3-butylene glycol di(meth)acrylates, tripropylene glycol di(meth)acrylates, polybutadiene di(meth)acrylates, methyl pentanediol di(meth)acrylates, cyclohexane dimethanol di(meth)acrylates, dipropylene glycol di(meth)acrylates, alkoxylated hexanediol di(meth)acrylates, alkoxylated cyclohexane dimethanol di(meth)acrylates, NPG-hydroxypivaldehyde adipic acid, polypropylene glycol di(meth)acrylates, metallic di(meth)acrylates, modified metallic di(meth) acrylates, (meth)acrylated polybutadienes, alkoxylated neopentyl glycol di(meth)acrylates, tricyclodecane dimethanol di(meth)acrylates, alkoxylated aliphatic di(meth)acrylates, trimethylolpropane tri(meth)acrylates, tris (2-hydroxy ethyl) isocyanurate tri(meth)acrylates, ethoxylated trimethylolpropane tri(meth)acrylates, pentaerythritol tri(meth) acrylates, propoxylated trimethylolpropane tri(meth)acrylates, triallyl isocyanurate, alkoxylated trifunctional (meth) acrylate esters, propoxylated glyceryl tri(meth)acrylates, trifunctional (meth)acrylic acid esters of phosphoric acid, trifunctional (meth)acrylic acid esters of sulfuric acid, pentaerythritol tetra(meth)acrylates, di-trimethylolpropane tetra (meth)acrylates, ethoxylated pentaerythritol tetra(meth) acrylates, pentaerythritol polyoxyethylene tetra(meth) acrylates, and dipentaerythritol penta (meth)acrylates.

15. The elastic material of claim 1, wherein the mixture of the at least one high Tg monoacrylate-functionalized monomer and the at least one low Tg monoacrylate-functionalized monomer of component b) exhibits a Hansen Solubility Parameter Distance Relative Energy Difference with the (meth)acrylate-functionalized oligomer of component a) of at least 3 MPa1/2.

16. The elastic material of claim 1, wherein the at least one high Tg monofunctional monomer and the at least one low Tg monofunctional monomer are present in the curable composition in a mass ratio of from 1:5 to 5:1.

17. The elastic material of claim 1, wherein component b) is the i) at least one high Tg monoacrylate-functionalized monomer and the at least one low Tg monoacrylate-functionalized monomer.

18. The elastic material of claim 17, wherein the at least one high Tg monoacrylate-functionalized monomer comprises isobornyl acrylate, and the at least one low Tg monoacrylate-functionalized monomer comprises 2(2-ethoxyethoxy) ethyl acrylate.

19. The elastic material of claim 1, wherein the curable composition additionally comprises a component e) wherein component e) is at least one adhesion-enhancing compound that does not contain (meth)acrylate functionality.

20. The elastic material of claim 1, wherein component b) comprises ii) the at least one monomer of the formula

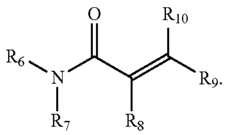

21. A method of making an elastic material having an elongation greater than 150% as measured according to ASTM D638-02a, a resiliency greater than 12% as measured according to ASTM D2632-01 (reapproved 2008), and a Shore A hardness of at least 10 as measured by ASTM D2240-15e1, and wherein the elastic material is an energy-cured reaction product of a curable composition which is a liquid at 25° C. and which is comprised of components a), b) and c):

a) 43 to 89.9% by weight, based on the total weight of components a), b) and c), of (meth)acrylate-functionalized oligomer having no more than two (meth)acrylate functional groups per molecule on average, wherein the number average molecular weight of component a) as a whole as measured using gel permeation chromatography and polystyrene standards is at least 10,000 Daltons;

b) 10 to 55% by weight, based on the total weight of components a), b) and c), of:

i) at least one high Tg monoacrylate-functionalized monomer and at least one low Tg monoacrylate-functionalized monomer or ii) at least one monomer of formula

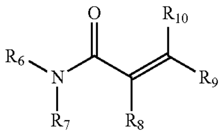

wherein:

$R_6$ and $R_7$ are independently selected from H, alkyl, aryl, $-L_3-C(=O)-R_{12}$, cycloalkyl, aminoalkyl and alkoxyalkyl; or $R_6$ and Ry may form, with the nitrogen atom to which they are attached, a 4 to 10-membered ring;

$R_8$, $R_9$ and $R_{10}$ are independently selected from H, alkyl and Cl;

$R_{12}$ is H or alkyl; and $L_3$ is alkylene; and c) 0.1 to 10% by weight, based on the total weight of components a), b) and c), of at least one multi(meth)acrylate-functionalized monomer having a molecular weight of less than 1000 Daltons and at least two (meth)acrylate functional groups per molecule, the method comprising energy-curing the curable composition.

* * * * *